United States Patent
Hatabu

(10) Patent No.: US 7,209,635 B2
(45) Date of Patent: Apr. 24, 2007

(54) MOVING PICTURE EDITING METHOD, MOVING PICTURE EDITING SYSTEM AND STORING MEDIUM WITH MOVING PICTURE EDITING PROGRAMS STORED THEREIN

(75) Inventor: Atsushi Hatabu, Tokyo (JP)

(73) Assignee: NEC Corporation, Tokyo (JP)

( * ) Notice: Subject to any disclaimer, the term of this patent is extended or adjusted under 35 U.S.C. 154(b) by 1269 days.

(21) Appl. No.: 09/986,015

(22) Filed: Nov. 7, 2001

(65) Prior Publication Data

US 2002/0081094 A1 Jun. 27, 2002

(30) Foreign Application Priority Data

Nov. 8, 2000 (JP) .............................. 2000-340208

(51) Int. Cl.
H04N 5/76 (2006.01)
H04N 7/26 (2006.01)
G11B 27/00 (2006.01)

(52) U.S. Cl. ......................................... 386/52; 386/111

(58) Field of Classification Search ..............................
375/240.12–240.16, 240.26–240.29; 386/4, 386/33, 52, 111–112; 348/434.1, 435.1
See application file for complete search history.

(56) References Cited

U.S. PATENT DOCUMENTS

| | | | | |
|---|---|---|---|---|
| 5,912,709 A | * | 6/1999 | Takahashi | .............. 375/240.15 |
| 6,091,460 A | * | 7/2000 | Hatano et al. | ............... 348/699 |
| 6,104,441 A | * | 8/2000 | Wee et al. | .............. 375/240.15 |
| 6,300,973 B1 | * | 10/2001 | Feder et al. | .............. 348/14.09 |
| 6,393,059 B1 | * | 5/2002 | Sugiyama | ............... 375/240.02 |
| 6,501,800 B1 | * | 12/2002 | Sawada | .................. 375/240.16 |
| 6,507,618 B1 | * | 1/2003 | Wee et al. | .............. 375/240.16 |
| 6,735,253 B1 | * | 5/2004 | Chang et al. | .......... 375/240.16 |

FOREIGN PATENT DOCUMENTS

| | | |
|---|---|---|
| JP | 07-154802 | 6/1995 |
| JP | 08-205174 | 8/1996 |

* cited by examiner

Primary Examiner—Thai Q. Tran
Assistant Examiner—Gelek Topgyal
(74) Attorney, Agent, or Firm—Sughrue Mion, PLLC

(57) ABSTRACT

A moving picture editing method is disclosed, in which if one or two reference frames utilized for motion compensation of P or B frame, constituting a part of moving picture before editing and not deleted in edition so as to constitute moving picture after editing, is subject to error generation in processing although not subject to lack in edition, motion vectors in a range centered on each motion vector V before editing of the P or B frame, are searched for the motion vector V' after editing corresponding to the minimum value of the difference between the motion compensated picture MC (X, V) before edition and motion compensated picture MC (X', V') after editing.

15 Claims, 14 Drawing Sheets

180# MOVING PICTURE EDITING METHOD, MOVING PICTURE EDITING SYSTEM AND STORING MEDIUM WITH MOVING PICTURE EDITING PROGRAMS STORED THEREIN

BACKGROUND OF THE INVENTION

This application claims benefit of Japanese Patent Application No. 2000-340208 filed on Nov. 8, 2000, the contents of which are incorporated by the reference.

The present invention relates to moving picture editing method, moving picture editing system and storing medium with moving picture editing programs stored therein and, more particularly, to moving picture editing method, moving picture editing system and string medium with moving picture editing program stored therein, in which compression coded moving picture is edited by utilizing inter-frame prediction based on motion compensation.

As moving picture compression method for compression coding moving picture, moving picture compression methods utilizing inter-frame prediction based on motion compensation have been extensively utilized. Among the moving picture compression methods of this type are "H. 261", "H. 262" and "H. 263" recommended by International Telecommunication Union-Telecommunication Standardization Sector and "MPEG1", "MPEG2" and "MPEG4" recommended by Moving Picture Expert Group.

In the moving picture compression methods of this type, intra-frame coding and inter-frame predictive coding are used as means for coding individual moving picture frames. In the intra-frame coding, only pixel data constituting frames as the subject of coding (hereinafter referred to as subject frames) are used for compression coding. In this case, it is possible to decode the original frames by using only coded data of intra-frame coded frames (hereinafter referred to I (intra) frames).

In the inter-frame predictive coding, on the other hand, frames preceding and/or succeeding subject frames are used as reference frames for compression coding by utilizing predicted picture obtained by motion compensation. The inter-frame predictive coding using frames preceding the subject frame as reference frames are referred to as preceding predictive coding. The inter-frame predictive coding utilizing frames succeeding the subject frames is referred to as succeeding predictive coding. The inter-frame predictive coding using frames both preceding and succeeding the subject frames is referred to as bilaterally predictive coding. Coded frames obtained by the preceding prediction coding are referred to as P (predictive) frames. Coded frames obtained by the bidirectionally predictive coding are referred to as B (bidirectionally predictive) frames.

As shown above, I frames are obtained by compression coding using only pixel data constituting the subject frames without utilizing any reference frame. P frames are obtained by compression coding using I or P frames preceding the subject frames as reference frames. B frames are obtained by compression coding using I and P frames both preceding and succeeding the subject frames as the reference frames. B frames are not used as reference frames. The compression coded moving picture is usually constituted by continuous frames such as I, B, B, P, B, B, P, B, B, . . . . The inter-frame predictive coding can increase the data compression efficiency compared to the intra-frame predictive coding. In order to decode subject frames from inter-frame predictive coded frames, however, frames obtained by decoding reference frames used in motion compensation are necessary.

In the meantime, a moving picture compression method permitting the motion compensation with a pixel accuracy less than the decimal fraction such as half pixel unit has been proposed. In this moving picture compression method, pixel data at positions having non-integer coordinates can be generated by averaging pixel data present at 2 or 4 integer coordinate positions in the neighborhood of their coordinate positions. For details of the moving picture compression method as described before, reference is to be had to, for instance, "Generic Coding of Moving Picture and Associated Audio", ISO/IEC JTC1/SC29/WG11N0502, 1993.7.

In editing such as deletion or extraction, in a given frame unit, from moving picture which has been compression coded in the moving picture compression method as described above, if the deleting or extracting process is performed from I, P or B frames directly without making decoding and re-encoding, it may fail to generate a moving picture which can be correctly decoded. For example, when connecting, in a first and a second moving picture with continuous I, B, B, P, B, B, P, B, B, . . . frames, the second P frame in the first moving picture and the first P frame in the second moving picture, results in a lack of the I frame in the second moving picture in the result. This is so because, as described before, the first P frame in the second moving picture is obtained by compression coding using the preceding I frame as the reference frame. Consequently, it becomes impossible to decode the first P frame in the second moving picture. This may be avoided by decoding all the frames of the first and second moving pictures before the connection, and re-encoding the result obtained by the connection. Doing so, however, requires enormous computational effort. Besides, the picture quality of the moving picture obtained as a result the connection by the re-encoding is greatly deteriorated.

Recently, moving picture editing methods, which permit editing compression coded moving pictures with a simple construction, with less computational effort and without any lack of frames necessary for the decoding, have been proposed, as disclosed in, for instance, Japanese Patent Laid-Open No. 8-205174 and Japanese Patent Laid-Open No. 7-154802.

First, the operation of a prior art moving picture editing system disclosed in the Japanese Patent Laid-Open No. 8-205174, will be described with reference to FIGS. 12(a) to 12(f). This technique is referred to as first prior art example.

In this case, it is assumed that a moving picture having compression coded in the order as shown in FIG. 12(b) is accumulated in a first accumulating part of the system and is displayed on a display part of the system in the order as shown in FIG. 12(a), and that dot-shaded frames ($B_{5,4}$ frame up to $B_{12,11}$ frame) among a plurality of frames shown in FIG. 12(a) are necessary for editing. Of the postscripts m and n in the individual frames, the postscript m represents the order of accumulation in the first accumulating part, and the postscript n represents the order of display on the display part.

First, the individual frames are read out in the order as shown in FIG. 12(b) from the first accumulating part, and are then decoded and displayed in the order as shown in FIG. 12(a) on the display part. When the start of editing is commanded by the system operator, tentative holding of the frames in a tentative holding part of the system is started from the prevailing frame displayed on the display part (hereinafter referred to as editing start frame). In the example shown in FIG. 12(a), the tentative holding is started from $B_{5,4}$ frame. In the case that a B frame is the editing start frame, if a P frame to be displayed on the display part later than that B frame is detected as the prevailing displayed frame, a plurality of frames having been tentatively held up to this time (i.e. from $B_{5,5}$ frame up to $P_{4,6}$ frame shown in FIG. 2(c)) and the frame number of the detected P frame are stored and held as editing start data in the memory part. Also, succeeding frames (i.e., $B_{8,7}$ frame up to $P_{7,9}$ frame shown in FIG. 12(a)) are continually tentatively held in the order of display on the display part until an editing end command is provided by the operator. When the editing end command is provided by the operator, if a B frame is detected at this time as the prevailing frame displayed on the display part, a plurality of frames having been tentatively held up to this time (i.e., from $B_{11,10}$ frame up to $B_{12,11}$ frame shown in FIG. 12(a)) and the frame number of the editing end frame are stored and held as editing end data in the memory part.

When the plurality of frames and the editing start and end frames, necessary for the editing, have been selected in the above process, the coding is started. In the coding, as shown in FIG. 12(d), $B_{5,4}$ frame, $B_{6,5}$ frame and $P_{4,6}$ frame stored and held as the editing start data in the memory part are intra-frame coded to $I_{5,4}$ frame, $I_{6,5}$ frame and $I_{4,6}$ frame, respectively, and $B_{11,10}$ and $B_{12,11}$ frames stored and held as the editing end data in the memory part are intra-frame coded to $I_{11,10}$ frame and I12,11 frame, respectively. Then, a plurality of frames (i.e., form $P_{7,9}$ frame up to $B_{9,8}$ frame shown in FIG. 12(b)) between the editing start and end frames are read out from the first accumulating part on the basis of the frame numbers of the editing start and end frames. These read-out frames and the plurality of frames intra-coded frames (i.e., $I_{5,4}$ frame, $I_{6,5}$ frame, $I_{4,6}$ frame, $I_{11,10}$ frame and $I_{21,11}$ frame shown in FIG. 12(e)) are combined in such a way that they can be normally reproduced, thus obtaining a necessary moving picture. The combined data is displayed on the display part as shown in FIG. 12(f), and it is also accumulated in the order as shown in FIG. 12(e) in the second accumulation part. The frames having been accumulated in the second accumulating part, which constitute the moving picture, are not correlated to the other frames, and thus can be solely decoded. As shown, in this arrangement only the frames which become incapable, as a result of the editing, of being normally reproduced are coded. It is thus possible to reduce the computational effort of the coding.

Now, the operation of a prior art moving picture editing system disclosed in the Japanese Patent Laid-Open No. 7-154802, will be described with reference to FIG. 13. This technique will be hereinafter referred to as second prior art example.

A case will now be considered with reference to FIGS. 13(a) to 13(c) that, a compression coded moving picture as shown in FIG. 12(c) (hereinafter refer to as third moving picture) is produced by connecting each other at editing point as shown by dashed line X, a compression coded moving picture as shown in FIG. 12(a) (hereinafter referred to as first moving picture) and a compression coded moving picture as shown in FIG. 12(b) (hereinafter referred to as second moving picture). In FIG. 13(c), prime symbol "'" means that a frame once decoded has been coded again.

It is now assumed that frames from I frame of frame number 2 up to B frame of frame number 4 earlier than the editing point, constitute a first and a second inputted moving picture. In this case, a CPU (central processing unit) in the moving picture editing system outputs the inputted frames constituting the first moving picture directly as a third moving picture. The inputted frames constituting the second moving picture are successively decoded in the decoding part.

When frames succeeding the editing point are inputted, the CPU operates as follows. When P frame right after the editing point (i.e., P frame of frame number 8 in FIG. 13(b)) is inputted as a decoded frame constituting the second moving picture, the CPU controls the coding part to code the P frame to I frame and, as shown in FIG. 13(c), outputs the coded frame (i.e., P frame of frame number 8 in FIG. 13(c) as third moving picture. When B frames (i.e., B frames of frame numbers 6 and 7 in FIG. 13(b)) are inputted as decoded frames constituting the second moving picture, I frame of frame number 5, necessary for the preceding predictive coding, lacks. Accordingly, the CPU controls the coding part to re-encode these B frames to P frames (i.e., P' frames of frame numbers 6 and 7 in FIG. 13(c)) by utilizing the succeeding predictive coding.

As for P and B frames of frame number 11 and following frame numbers constituting the second moving picture as shown in FIG. 13(b), since the frames utilized for the inter-frame predictive coding have been re-encoded, the CPU resets the predicted picture to a right one, and controls the coding part to re-encode P frames to P frames and B frames to B frames (i.e., P' and B' frames of frame number 11 and following frame numbers in FIG. 13(c)). In these re-encoding processes, what has been obtained by decoding the frames constituting the second moving picture as shown in FIG. 13(b) is used as motion compensation mode data, motion vector, DCT (discrete cosine transform) switching data. Thus, prior art motion detection circuit and DCT mode judging circuit which require enormous computational efforts are unnecessary, and the motion compensation circuit can be replaced with one having a simpler construction.

In the first and second prior art examples as moving picture editing system as described above, when re-encoding P and B frames to I frames, re-encoding error is generated in the re-encoded I frames. Thus, when using I frame with an error generated therein by editing as a reference frame for re-encoding P and B frames, the re-encoding results in a change in the motion compensation picture after the editing. This motion compensation picture change leads to generation of errors in the P and B frames. Particularly, when a moving picture constituted by continuous P frames is edited by deleting frames of frame numbers 1 to 3 as shown in FIG. 14(a), re-encoding error generated when re-encoding the I frame shown in FIG. 14(b) is propagated up to the last frame to increase the picture quality deterioration.

SUMMARY OF THE INVENTION

The present invention was made in view of the above background situation, and it has an object of providing moving picture editing method, moving picture editing system and storing medium with moving picture editing programs stored therein, which permit such editing as deletion and extraction with a simple construction, with less computational effort and without possibility of lack of frame necessary for decoding even with compression coded moving picture and can also suppress picture quality deterioration due to editing.

According to a first aspect of the present invention, there is provided a moving picture editing method for editing compression coded moving picture by utilizing inter-frame prediction based on motion compensation, wherein: if one or two reference frames utilized for motion compensation of a subject frame, constituting a part of the moving picture before editing and not deleted in edition so as to constitute a part of the moving picture after editing, is or are subject to error generation in processing although not subject to lack in edition, motion vectors in a range centered on each motion vector before editing of the subject frame are searched for the motion vector after editing corresponding to the minimum value of the difference between the motion compensated picture before editing and motion compensated picture after editing.

According to a second aspect of the present invention, there is provided a moving picture editing method for editing compression coded moving picture by utilizing inter-frame prediction based on motion compensation, wherein: if one or two reference frames utilized for motion compensation of a subject frame, constituting a part of the moving picture before editing and not deleted in edition so as to constitute part of the moving picture after editing, is or are subject to error generation in processing although not subject to lack in edition, motion vectors in a range centered on each motion vector before editing of the subject frame are searched for the motion vector after editing corresponding to the minimum value of the difference between the motion compensated picture before editing and motion compensated picture after editing, and picture difference obtained as a result of subtraction of motion compensated picture after edition, obtained by motion compensation utilizing motion vector after editing, from decoded data before editing of the subject frame, is coded to obtain picture difference coded data after editing, and coding is performed from the picture difference coded data after editing thus obtained and the motion vectors after editing to obtain coded data after editing of the subject frame.

According to a third aspect of the present invention, there is provided a moving picture editing method for editing compression coded moving picture by utilizing inter-frame prediction based on motion compensation, wherein: if one or two reference frames utilized for motion compensation of a subject frame, constituting a part of the moving picture before editing and not deleted in edition so as to constitute part of the moving picture after editing, is subject to error generation in processing although not subject to lack in edition, and also if either one of the reference frames meets at least a condition that error generation in it takes place as a result of re-encoding in edition or a condition that the coded data and the motion vector are changed in edition such that the number of macroblocks having difference between motion vector before editing and motion vector after editing exceed a predetermined threshold number, motion vectors in a range centered on each motion vector before editing of the subject frame are searched for the motion vector after editing corresponding to the minimum value of the difference between the motion compensated picture before edition and motion compensated picture after edition, and also the number of macroblocks having difference between the motion vector before editing and the motion vector after editing are counted.

According to a fourth aspect of the present invention, there is provided a moving picture editing method for editing compression coded moving picture by utilizing inter-frame prediction based on motion compensation, wherein: if one or two reference frames utilized for motion compensation of a subject frame, constituting a part of the moving picture before editing and not deleted in edition so as to constitute part of the moving picture after editing, is subject to error generation in processing although not subject to lack in edition, and also if either one of the reference frames meets at least a condition that its error generation takes place as a result of re-encoding in edition or a condition that coded data is changed, picture difference is re-encoded in edition and the number of picture difference coded data after editing and picture difference coded data before editing exceed a predetermined threshold number, picture difference obtained as a result of subtraction of motion compensated picture after editing, obtained by motion compensation utilizing the motion vector after editing of the subject frame, from decoded data before editing of the subject frame is coded to obtain picture difference coded data after editing, also coding is performed from the picture difference coded data after editing and the motion vectors before editing to obtain coded data after editing of the subject frame, and the number of macroblocks having difference between picture difference coded data after editing and picture difference coded data before editing.

According to a fifth aspect of the present invention, there is provided a moving picture editing method for editing compression coded moving picture by utilizing inter-frame prediction based on motion compensation, wherein: if one or two reference frames utilized for motion compensation of a subject frame, constituting a part of the moving picture before editing and not deleted in edition so as to constitute part of the moving picture after editing, is subject to error generation in processing although not subject to lack in edition, and also if either one of the reference frames meets a condition that the coded data and motion vector are changed in edition, such that the number of macroblocks having difference between motion vector before editing and motion vector after editing exceed a predetermined threshold number, and also meets at least a condition that the coded data is not changed in edition, a condition that the picture difference is not re-encoded in edition, although the coded data is changed therein, or a condition that, although change in the coded data and re-encoding of the picture difference have taken place in edition, the number of macroblocks having difference between picture difference coded data after editing and picture difference coded data before editing is less than a predetermined threshold number, motion vectors in a range centered on each motion vector before editing of the subject frame are searched for the motion vector corresponding to the minimum value of the difference between the motion compensated picture before editing and motion compensated picture after editing, and the number of macroblocks having difference between motion vector before editing and motion vector after editing are counted; if the one or two reference frames each meet at least a condition that the coded data is not changed in edition, a condition that the motion vectors are not changed in edition, or a condition that, the number of macroblocks having difference between motion vector before editing and motion vector after editing is less than a predetermined threshold number, while the one or two frames meet a condition that change in the coded data and re-encoding of the picture difference have taken place in edition such that the number of macroblocks having difference between picture difference coded data after editing and picture difference coded data before editing exceed a predetermined threshold number, picture difference obtained as a result of subtraction of motion compensated picture after editing, obtained by motion compensation utilizing the motion vector after editing of the subject frame, from decoded data before editing of the subject frame is coded to obtain picture difference coded data after editing, also coding is performed from the picture difference coded data after editing and the motion vector after editing of the subject frame, and the number of macroblocks having difference between picture difference coded data after editing and picture difference coded data before editing are counted; and if one of the one or two reference frames meets at least a first condition that it is a frame subject to error generation due to re-encoding in edition, or a second condition that change in the coded data and re-encoding of picture difference have taken place in edition such that the number of macroblocks having difference between motion vector before editing and motion vector after editing exceed a predetermined threshold number and the number of macroblocks having difference between picture difference coded data after editing and picture difference coded data before editing exceed a predetermined threshold number, motion vector in a range centered on motion vector before editing of the subject frame are searched for the motion vector corresponding to the minimum value of the difference between the motion compensated picture before editing and motion compensated picture after editing, the number of macroblocks having difference between the motion vector before editing and the motion vector after editing are counted, picture difference obtained as a result of subtraction of motion compensated picture after editing, obtained by motion compensation utilizing the motion vector after editing of the subject frame, from decoded data before editing of the subject frame to obtain picture difference coded data after editing, coding is performed from the picture difference coded data after editing and the motion vector before editing to obtain coded data after editing of the subject frame, and the number of macroblocks having difference between picture difference coded data after editing and picture difference coded data before editing are counted.

In the moving picture editing method, candidates for each motion vectors after editing are limited to motion vectors present in a predetermined range centered on the motion vector before editing. Candidates for each motion vectors after editing are limited to motion vectors, which are equal to motion vector before editing or motion vectors present in a predetermined range centered on the motion vector before editing and having non-integer coordinate value as horizontal or vertical coordinate value.

According to a sixth aspect of the present invention, there is provided a moving picture editing system for editing compensation coded moving picture by utilizing inter-frame prediction based on motion compensation, comprising: a motion vector searcher for searching motion vectors in a range centered on each motion vector before editing for a motion vector corresponding to the minimum value of the difference motion compensated picture before editing and motion compensated picture after editing; and a controller for controlling, if one or two reference frames utilized for motion compensation of a picture frame, constituting a part of the moving picture before editing and not deleted in edition so as to constitute part of the moving picture after edition, is subject to error generation in processing although not subject to lack in edition, the motion vector searcher to search for the motion vector after editing of the subject frame.

The moving picture editing system further comprising: a motion compensator for executing motion compensation utilizing motion vector after editing to obtain motion compensated picture after editing; a subtracter for subtracting motion compensated picture after editing from decoded data before editing of the subject frame to obtain picture difference; and a variable length coder for executing coding from the picture difference coded data after editing and the motion vector after editing to obtain coded data after editing of the subject frame.

According to a seventh aspect of the present invention, there is provided a moving picture editing system for editing compensation coded moving picture by utilizing inter-frame prediction based on motion compensation, comprising: a motion vector searcher for searching motion vectors in a range centered on each motion vector before editing for a motion vector corresponding to the minimum value of the difference motion compensated picture before editing and motion compensated picture after editing; a counter for counting macroblocks having difference between motion vector before editing and motion vector after editing; and a controller functioning such that, if one or two reference frames utilized for motion compensation of a subject frame, constituting a part of the moving picture before editing and not deleted in edition so as to constitute a part of the moving picture after editing, is subject to error generation in processing although not subject to lack in edition, and also if either one of the reference frames meets at least a condition that error generation in it takes place as a result of re-encoding in edition or a condition that the coded data and the motion vector are changed in edition such that the number of macroblocks having difference between motion vector before editing and motion vector after editing exceed a predetermined threshold number, it controls the motion vector searcher to search for the motion vector after editing of the subject frame and the counter to count the number of macroblocks having difference between motion vector before editing and motion vector after editing.

According to an eighth aspect of the present invention, there is provided a moving picture editing system for editing compensation coded moving picture by utilizing inter-frame prediction based on motion compensation, comprising: a motion compensator for executing motion compensation utilizing motion vector after editing to obtain motion compensated picture after editing; a subtracter for subtracting motion compensated picture after editing from decoded data before editing of the subject frame to obtain picture difference; a variable length coder for executing coding from the picture difference coded data after editing and the motion vector after editing to obtain coded data after editing of the subject frame; a counter for counting macroblocks having difference between picture difference coded data after editing and picture difference coded data before editing; and a controller functioning such that, if one or two reference frames utilized for motion compensation of a subject frame, constituting a part of the moving picture before editing and not deleted in edition so as to constitute a part of the moving picture after editing, is subject to error generation in processing although not subject to lack in edition, and also if either one of the reference frames meets at least a condition that error generation in it takes place as a result of re-encoding in edition or a condition that the coded data is changed in edition and the picture difference is re-encoded such that the number of macroblocks having difference between picture difference coded data after editing and picture difference coded data before editing exceed a predetermined threshold number, it controls the motion compensator to obtain the motion vector after editing of the subject frame, the subtracter to subtract the motion compensated picture after editing from the decoded data before editing of the subject frame, the picture difference coder to code the picture difference coded data after editing, variable length coder to code the coded data after editing of the subject frame, and the counter to count the number of macroblocks having difference between picture difference coded data after editing and picture difference coded data before editing.

According to a ninth aspect of the present invention, there is provided a moving picture editing system for editing compensation coded moving picture by utilizing inter-frame prediction based on motion compensation, comprising: a motion vector searcher for searching motion vectors in a range centered on each motion vector before editing for a motion vector corresponding to the minimum value of the difference motion compensated picture before editing and motion compensated picture after editing; a first counter for counting the number of macroblocks having difference between motion vector before editing and motion vector after editing; a motion compensator for performing motion compensation utilizing the motion vector of the frame after editing to obtain motion compensated picture; a subtracter for subtracting the motion compensated picture after editing from the decoded data before editing of the subject frame; a picture difference coder for coding the picture difference coded data after editing from the picture difference; a variable length coder for coding the coded data after editing of the subject frame from the difference picture coded data after editing and the motion vector after editing; a second counter for counting macroblocks having difference between picture difference coded data after editing and picture difference coded data before editing; and a controller functioning such that: if one or two reference frames utilized for motion compensation of a subject frame, constituting a part of the moving picture before editing and not deleted in edition so as to constitute a part of the moving picture after editing, is subject to error generation in processing although not subject to lack in edition, and also if either one of the reference frames meets a condition that the coded data and the motion vector are changed in edition, such that the number of macroblocks having difference between motion vector before editing and motion vector after editing exceed a predetermined threshold number, and also meets at least a condition that the coded data is not changed in edition, a condition that the picture difference is not re-encoded in edition, although the coded data is changed therein, or a condition that, although change in the coded data and re-encoding of the picture difference have taken place in edition, the number of macroblocks having difference between picture difference coded data after editing and picture difference coded data before editing is less than a predetermined threshold number, it controls the motion vector searcher to search the motion vector after editing of the subject frame and also control the first counter to count the number of macroblocks having difference between the motion vector before editing of the subject frame and the motion vector after editing thereof, if the one or two reference frames each meet at least a condition that the coded data is not changed in edition, a condition that motion vectors are not changed in edition, or a condition that the number of macroblocks having difference between motion vector before editing and motion vector after editing is less than a predetermined threshold number, while the one or two reference frames meet a condition that change in the coded data and re-encoding of the picture difference have taken place in edition such that the number of macroblocks having difference between picture difference coded data after editing and picture difference coded data before editing exceed a predetermined threshold number, it controls the motion compensator to obtain motion compensated picture after editing of the subject frame, controls the subtracter to subtract the motion compensated picture after editing of the subject frame from decoded data after editing of the subject frame so as to obtain picture difference, controls the picture difference coder to execute coding to obtain picture difference coded data after editing of the subject frame and controls the second counter to count macroblocks having difference between the picture difference coded data after editing of the subject frame and the picture difference coded data before editing thereof, and if one of the one or two reference frames meets at least a first condition that it is a frame subject to error generation due to re-encoding in edition, or a second condition that change in the coded data and re-encoding of the picture difference have taken place in edition such that the number of macroblocks having difference between motion vector before editing and motion vector after editing exceed a predetermined threshold number and the number of macroblocks having difference between picture difference coded data after editing and picture difference coded data before editing exceed a predetermined threshold number, it controls the motion vector searcher to search for the motion picture after editing of the subject frame, controls the first counter to count macroblocks having difference between motion vector before editing of the subject frame and motion vector before editing thereof, controls the subtracter to subtract the motion vector after editing of the subject frame from the decoded data before editing of the subject frame so as to obtain the picture difference, controls the picture difference coder to execute coding so as to obtain the picture difference coded data after editing of the subject frame, controls the variable length coder to execute coding so as to obtain coded data after editing of the subject frame and controls the second counter to count macroblocks having difference between the picture difference coded data after editing of the subject frame and the picture difference coded data after editing thereof.

In the moving picture editing system, the controller limits the range of search of motion vectors after editing in the motion vector searcher to motion vectors, which are the same as the motion vector after editing or motion vectors present in a range in the neighborhood of the motion vector after editing. The controller limits the range of search of motion vectors after editing in the motion vector searcher to motion vectors, which are the same as the motion vector after editing or motion vectors present in a range in the neighborhood of the motion vector after editing and having non-integer coordinate values as horizontal or vertical coordinate values.

According to other aspect of the present invention, there is provided a storing medium, in which moving picture editing programs for realizing the functions set forth in one of the above.

With the above constructions according to the present invention, such editing as deletion and extraction can be made with a simple construction, with Less computational effort and without lack of frames necessary for decoding even with compression coded moving picture. It is also possible to suppress picture quality deterioration due to editing.

Other objects and features will be clarified from the following description with reference to attached drawings.

PREFERRED EMBODIMENTS OF THE INVENTION

Preferred embodiments of the present invention will now be described with reference to the drawings.

Figure 1:
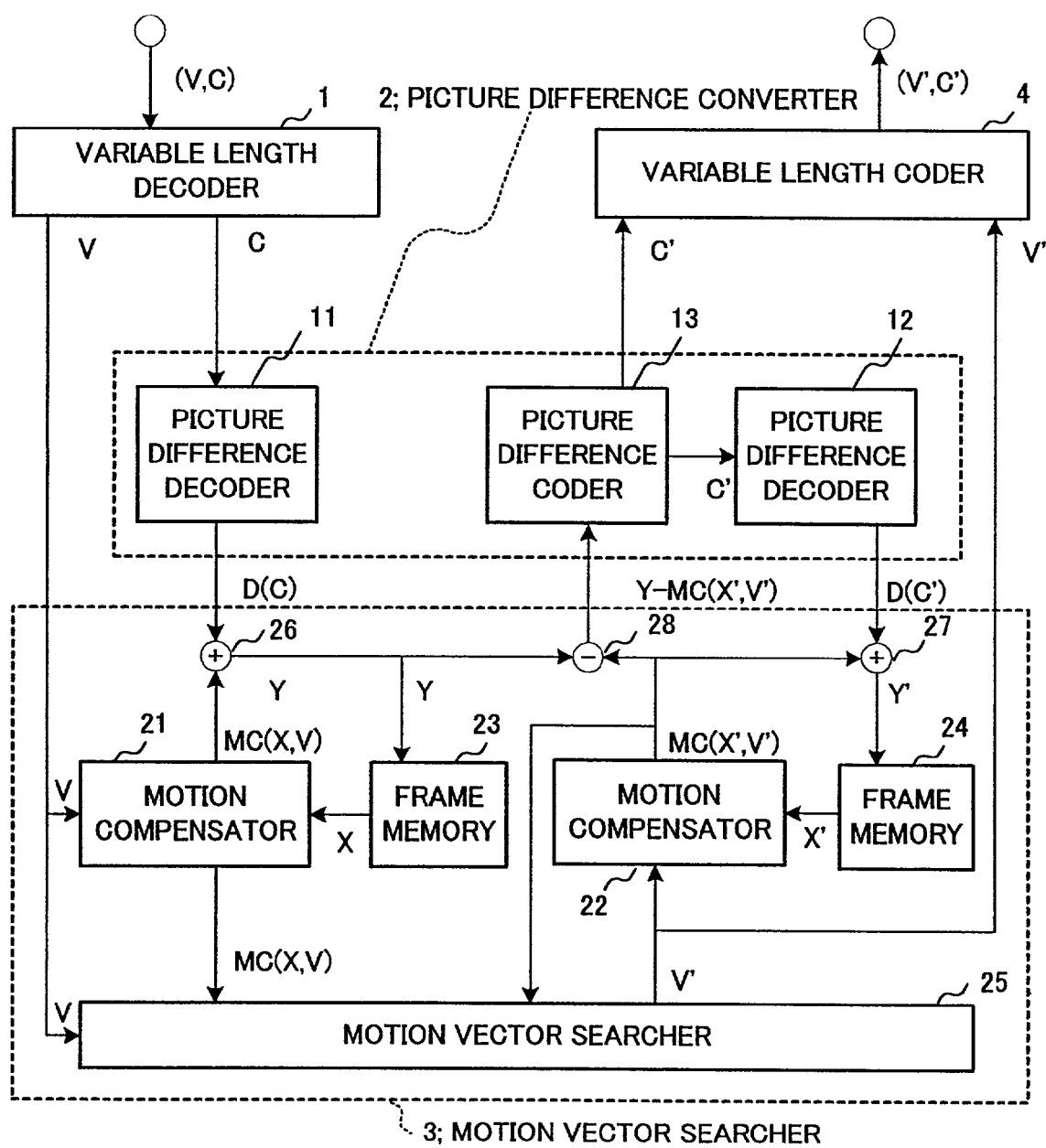
FIG. 1 is a block diagram showing the construction of an inter-frame predictive coding frame processor in a moving picture editing system implementing a first embodiment of the moving picture editing method according to the present invention.

A first embodiment of the present invention will be described. FIG. 1 is a block diagram showing the construction of an inter-frame predictive coding frame processor in a moving picture editing system implementing the first embodiment of the moving picture editing method according to the present invention.

This example of the inter-frame predictive coding frame processor is for processing inter-frame predictive coded P and B frames constituting moving picture as the subject of editing, and comprises a variable length decoder 1, a picture difference converter 2, a motion vector converter 3 and a variable length coder 4.

The variable length decoder 1 decodes coded data of inter-frame predictive coding frames before editing (hereinafter referred to as coded data before editing) (V, C), which comprises motion vector V before editing utilized for motion compensation and picture difference coded data C before editing for decoding to obtain picture difference D(C) before editing, to obtain the motion vector V before editing and the picture difference coded data C before editing, and feeds the motion vector V before editing to the motion vector converter 3 and the picture difference coded data C before editing to the picture difference converter 2.

The picture difference converter 2 includes picture difference decoders 11 and 12 and a picture difference coder 13. The picture difference decoder 11 decodes the picture difference coded data C before editing fed out from the variable length decoder 1, and feeds picture difference D(C) before editing thus obtained to the motion vector converter 3. The picture difference decoder 12 decodes picture difference coded data C' after editing fed out from the picture difference coder 13, and feeds picture difference D(C') after editing thus obtained to the motion vector converter 3. The picture difference coder 13 codes picture difference (Y−MC(X', Y')) fed out from the motion vector converter 3, and feeds picture difference coded data C' after editing thus obtained to the variable length coder 4 and the picture difference decoder 12.

Labeled Y is the subject of editing, i.e., decoded data of inter-frame predictive coding frame before editing (hereinafter referred to as decoded data before editing), which is represented by equation 1. Labeled MC(X', V') is motion compensated picture after editing, which is outputted by a motion compensator 22 as a result of motion compensation with reference to decoded picture after editing constituting reference frame for motion compensation, stored in a frame memory 24 (hereinafter referred to as reference picture after editing) X' by utilizing motion vector V' after editing.

$$Y = MC(X, V) + D(C) \quad (1)$$

where MC(X, V) is motion compensated picture before editing, which is outputted by a motion compensator 21 as a result of motion compensation with reference to decoded picture before editing constituting reference frame for motion compensation, stored in a frame memory 23 (hereinafter refereed to as reference picture before editing) X by utilizing motion vector V.

The motion vector converter 3 includes the motion compensators 21 and 22, the frame memories 24 and 25, adders 26 and 27 and a subtracter 28.

The motion compensator 21 executes motion compensation with reference to reference picture X before edition stored in the frame memory 23 by utilizing the motion vector V fed out from the variable length decoder 1 to obtain the motion compensated picture MC(X, V) before editing, and feeds out the motion compensated picture MC(X, V) before editing thus obtained to a motion vector searcher 25 and also to the adder 26. The motion compensator 22 executes motion compensation with reference to reference picture X' after edition stored in the frame memory 24 by utilizing motion vector V' after edition tentatively fed out from the motion vector searcher 25 to tentatively obtain motion compensated picture MC(X', V') after edition, and feeds the motion compensated picture MC(X', V') after edition thus tentatively obtained to the motion vector searcher 25. Also, the motion compensator 22 executes motion compensation by utilizing motion vector V' after edition finally fed out from the motion vector searcher 25 to finally obtain motion compensated picture MC(X', V') after edition, and feeds out the motion compensated picture MC(X', V') after edition thus finally obtained to the adder 27 and the subtracter 28.

The frame memory 23 is constituted by a semiconductor memory such as an RAM, an FD (floppy disk), an HD (hard disk) or an MO (magneto-optical) and a driver on which disk is mounted. Reference picture X before editing, which has been obtained in the editing of preceding frames, is stored in the semiconductor memory or the FD, HD or MO disc. Also, decoded data Y before editing is stored for the editing of the next frame. The frame memory 24 is constituted by a semiconductor memory such as an RAM, an FD (floppy disk), an HD (hard disk) or an MO (magneto-optical) and a driver on which disk is mounted.

Also, decoded data of inter-frame predictive coding frame after editing (hereinafter referred to as decoded data after editing) Y' (see equation (2)) is stored for the editing of the next frame.

$$Y' = MC(X', V') + D(C') \quad (2)$$

The motion vector searcher 25 searches a plurality of motion vectors present in a region centered on motion vector V before editing supplied from the variable length decoder 1 for a motion vector, which corresponds to the minimum value of the difference ΔM between the motion compensated picture MC(X, V) before editing fed out from the motion compensator 21 and motion compensated picture MC(X', V') after editing tentatively fed out from the motion compensator 22 (see equation 3). The motion vector searcher 25 feeds this searched motion vector as tentative motion vector after editing to the motion compensator 22, and also feeds motion vector V' after editing, which is finally obtained as a result of the search, to the motion compensator 22 and the variable length coder 4.

$$\Delta MC = MC(X', V') - MC(X, V) \quad (3)$$

The adder 26 adds together picture difference D(C) before editing fed out from the picture difference decoder 11 in the picture difference converter 2 and motion compensated picture MC(X, V) before editing fed out from the motion compensator 21. For the editing of the next frame, the sum result from the adder 26, i.e., decoded data Y before editing (refer to equation 1), is stored in the frame memory 23, and is also fed to the subtracter 28. The adder 27 adds together picture difference D(C') after editing fed out from the picture difference decoder 12 in the picture difference converter 2 and motion compensated picture MC(X', V') after editing fed out from the motion compensator 22. The sum result, i.e., decoded data Y' after editing (refer to equation 2) is stored in the frame memory 24 for the editing of the next frame.

The subtracter 28 subtracts motion compensated picture MC(X', V') after editing fed out from the motion compensator 22 from decoded data Y before editing fed out from the adder 26, and feeds out the difference result, i.e., picture difference (Y−MC(X', V')) to the picture difference coder 13 in the picture difference converter 2.

The variable length coder 4 executes coding from motion vector V' after editing fed out from the motion vector searcher 25 in the motion vector converter 3 and picture difference coded data C after editing fed out from the picture difference coder 13, and outputs resultant coded data inter-frame predictive coding frames after editing (hereinafter referred to as coded data after editing) (V', C').

The moving picture editing system comprises, in addition to the inter-frame predictive coding frame processing part having the above construction, a re-encoding processing part for re-encoding P and B frames, which are subject to lack of one or two reference frames to be utilized for motion compensation as a result of editing, to I frames or P and B frames using frames constituting moving picture after editing as reference frames, a control part constituted by a CPU or the like, an internal memory such as a ROM, a RAM, an external memory such as an FDD, an HDD, a CD-ROM, or an MO and a driver, etc. with an FD, an HD, a CD-ROM, an MO disc, etc. mounted thereon, a display unit constituted by a CRT display or a liquid crystal display, and a manipulating part constituted by a keyboard, a mouth, etc.

Figure 14:
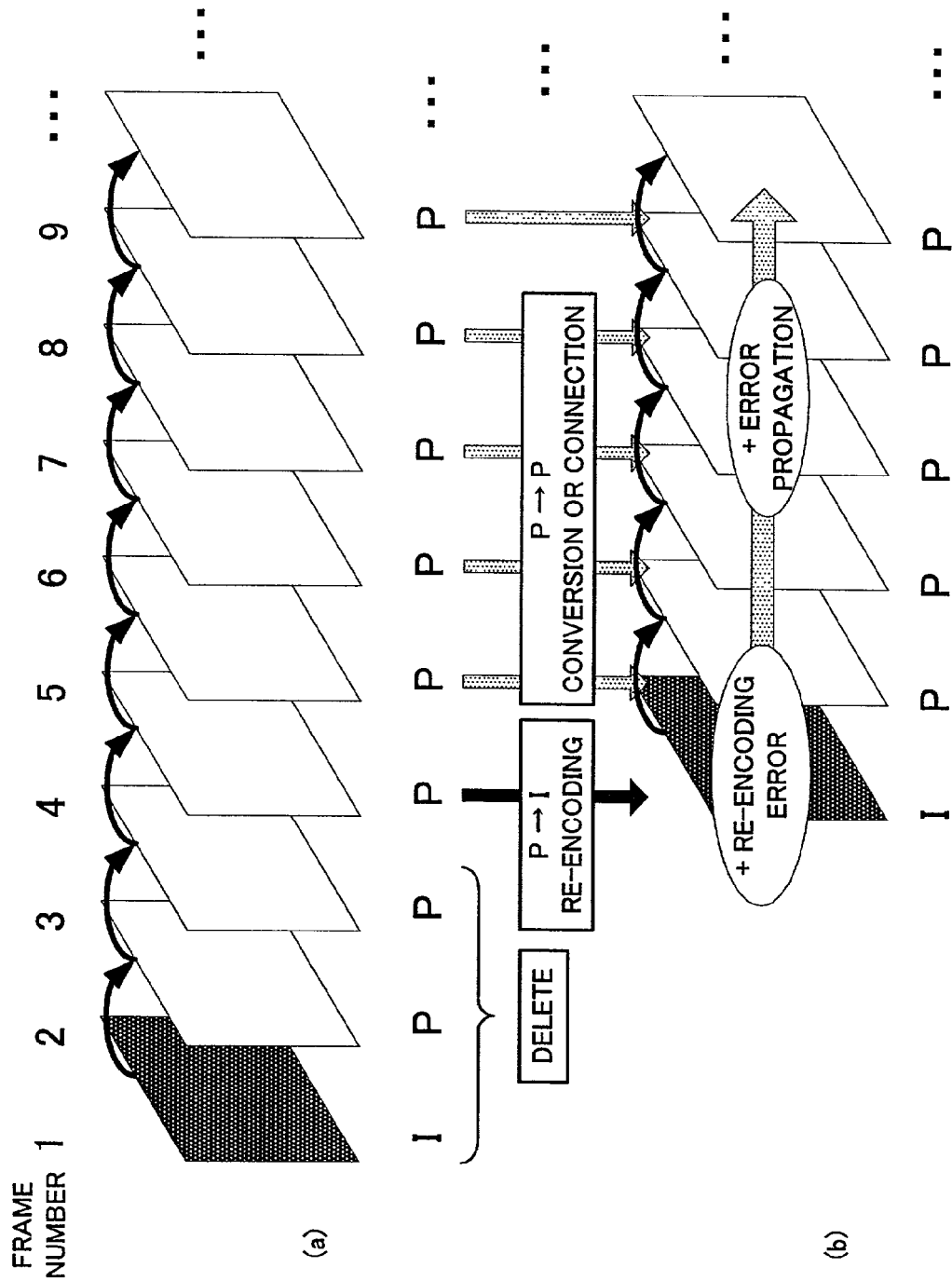
FIG. 14 is a drawing for explaining the problems of moving picture editing method according to the second prior art.

Now, an example of editing operation of the CPU in the moving picture editing system having the above construction, will be described with reference to FIG. 2. In this example, it is assumed that, as shown in FIG. 14(a), a moving picture, in which only frame of frame number 1 is I frame and frames of frame number 2 and following frame numbers are all P frame, is edited by extracting only frames of frame number 4 and following frame numbers.

Figure 2:
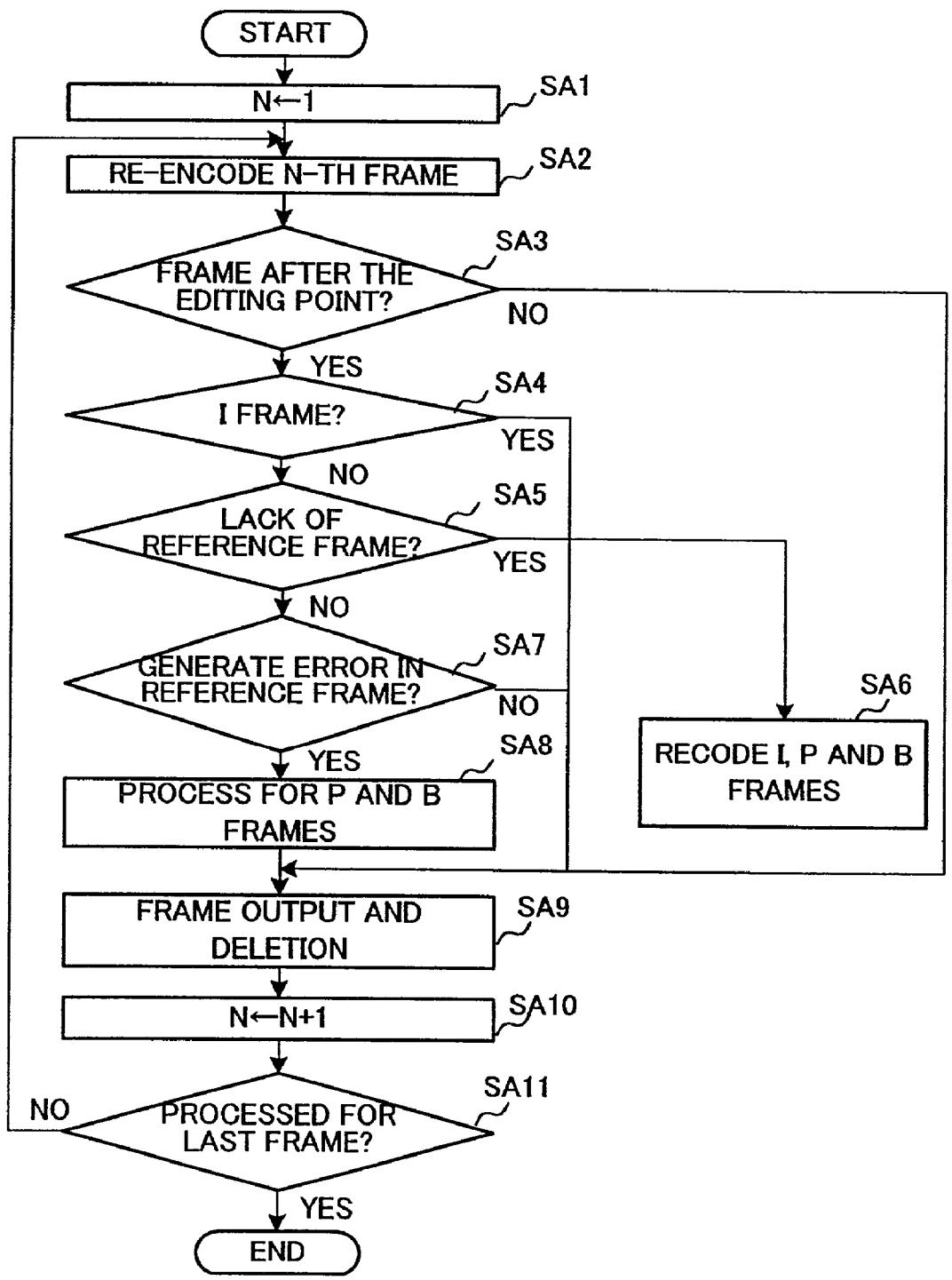
FIG. 2 is a flow chart showing an example of editing operation of the CPU in the moving picture editing system.

First, the CPU executes the processes of step SA1 in FIG. 2. In this step, the CPU sets "1" as initial value of frame number N given to each frame constituting an externally inputted moving picture, and then it executes step SA2.

In sep SA2, the CPU decodes coded data (V, C) before editing of frame of frame number N, and then executes step SA3. In step SA3, the CPU checks whether frame of frame number N having been decoded in the process of step SA2 is a frame after the editing point. If the result of this check is "NO", the CPU executes step SA9. Processing of step SA9 and following steps will be described later. In this example, since the editing is performed by extracting only the frames of frame number 4 and following frames as shown in FIG. 14(a), the frame of frame number 4 becomes the frame right after the editing point. Thus, for the frames of frame number N of "1" to "3" the result of check in step SA3 is "NO".

If the check result in step SA3 is "YES", that is, if frame of frame number N is a frame after the editing point, the CPU executes step SA4. In this example, when the frame number N becomes "4", the check result in step SA3 becomes "YES", and the CPU executes step SA4. Instep SA4, the CPU checks whether frame of frame number N is I frame. If the check result in step SA4 is "NO", that is, if the frame of frame number N is not I frame but P or B frame, the CPU executes step SA45. From FIG. 14(a), the frame of frame number 4 is not I frame but P frame, and the check result in the step SA4 is "NO". The CPU thus executes step SA5.

In step SA5, the CPU checks whether one or two reference frames used for the compression coding of frame of frame number N lack as a result of the editing operation. If the result of this check is "YES", the CPU executes step SA6. As shown in FIG. 14(a), the P frame of frame number 3 as reference frame for the P frame of frame number 4 lacks as a result of the editing operation, and the check result in the step SA5 becomes "YES". The CPU thus executes step SA6. In step SA6, the CPU controls the re-encoding processing part to re-encode P and B frames, with which one or two reference frames utilized for the compression coding of frame of frame number N lack as a result of editing operation, to I frames or to P or B frame, with which frame constituting moving picture after editing is used as reference frame. The process in step SA6 is substantially the same as a corresponding process in the first and second prior art examples described before, and is not described here. In this example, the P frame of frame number 4 is re-encoded to I frame.

If the check result in step SA5 is "NO", that is, if one or two reference frames utilized for the compression coding of frame of frame number N do not lack as a result of editing operation, the CPU executes step SA7. In step SA7, the CPU checks whether any error is generated in one or two reference frames utilized for the compression coding of frame of frame number N. If the result of this check is "NO", the CPU executes step SA9. On the other hand, if the check result in step SA7 is "YES", that is, if error is generated in one or two reference frames utilized for the compression coding of frame of frame number N, the CPU executes step SA8. As shown in FIG. 14(b), if error is generated in one reference frame utilized for the compression coding of the frame of frame number 5, that is, error is generated in the re-encoded I frame of frame number 4, the check result in step SA7 is "YES". The CPU thus executes step SA8.

In step SA8, the CPU controls the inter-frame predictive coding processing part shown in FIG. 1 for searching a plurality of motion vectors present in a region centered on motion vector V before editing of frame of frame number N, for motion vector V' after editing, which corresponds to the minimum value of the difference ΔM between the motion compensated picture MC(X, V) before editing and motion compensated picture MC(K', V') after editing, and coding picture difference (Y−MC(X', V')), which is obtained by subtracting motion compensated picture MC(X', V') after editing obtained by motion compensation utilizing the motion vector V' after editing from picture difference decoded data C' before editing to obtain picture difference coded data C' after editing. The CPU then executes coding to obtain coded data (V', C') after editing from the picture difference coded data C' after editing and the motion vector V' after editing, and then executes step SA9. Details of the processing in inter-frame predictive coding frame processing part in step SA8 will be described later.

In step SA9, if the CPU determines in step SA3 that the frame of frame number N is a frame before the editing point and is to be merely connected to a frame after editing, it causes the coded data before editing to be outputted directly as coded data after editing of the pertinent frame. If the CPU determines in step SA3 that the frame number N frame is a frame before the editing point and is to be deleted in the editing operation, on the other hand, it causes nothing to be outputted. Also, in step SA9, if the CPU determines in step SA4 that the frame of frame number N is I frame, it causes the coded data before editing to be outputted directly as coded data after editing of the pertinent frame, and causes coded data after editing of I, P or B frame having been re-encoded in step SA6 to be outputted. Furthermore, in step SA9, if the CPU determines in step SA7 that no error is generated in one or two reference frames to be utilized for compression coding, it causes the coded data before editing to be outputted directly as coded data after editing of the pertinent frame, and causes the coded data after editing obtained by controlling the inter-frame predictive frame processing part in step SA8 to be outputted. Then, the CPU executes step SA10.

In the instant example, the frames of frame numbers "1" to "3" shown in FIG. 14(a) are deleted and not outputted, and for the frame of frame number "4", coded data after editing of re-encoded I frame is outputted, and as for the frames of frame number "5" and following frame numbers coded data after editing of the re-encoded I, P or B frame obtained in step SA6 or coded data after editing obtained in step SA8 is outputted according to the check result in step SA5 or SA7.

In step SA10, the CUP increments the frame number by one for processing the next frame, and then executes step SA11. Instep SA11, the CPU checks whether new frame is no longer externally inputted, that is, the externally inputted frames have been processed up to the last frame. If the result of this check is "YES", the CPU brings an end to the series of operations. If the check result in step SA11 is "NO", that is, if the externally inputted frames have not yet been processed up to the last frame, the CPU returns to step SA2 to repeat the processing of steps SA2 through SA10 described above until the externally inputted frames have been processed up to the last frame.

Now, details of the processing executed in the inter-frame predictive coding frame processing part under control of the CPU in step SA8 will be described.

When coded data (V, C) before editing of inter-frame predictive coding frame is externally inputted, the variable length decoder 1 decodes the coded data (V, C) before editing to obtain motion vector V before editing and picture difference coded data before editing, and feeds the motion vector V before editing and the picture difference coded data before editing to the motion vector converter 3 and the picture difference converter 2, respectively.

The picture difference decoder 11 in the picture difference converter 2 decodes the picture difference coded data DC before editing from the picture difference coded data C fed out from the variable length decoder 1, and feeds picture difference D(C) before editing thus obtained to the motion vector converter 3. Also, the motion compensator 21 in the motion vector converter 3 executes motion compensation with reference to decoded picture X before editing stored in the frame memory 23 by utilizing motion vector V before editing fed out from the variable length decoder 1, and feeds motion compensated picture MC(X, V) before editing thus obtained to the motion vector searcher 25 and the adder 26. The adder 26 thus adds together the picture difference D(C) before editing and the motion compensated picture MC(X, V) before editing. The sum result thus obtained is stored as decoded data Y (refer to equation 1) before editing in the frame memory 23 for the editing of the next frame, and is also fed to the subtracter 28.

Then, the motion vector searcher 25 searches a plurality of motion vectors present in a region centered on motion vector V before editing, for a motion vector, which corresponds to the minimum value of difference A M (refer to equation 3) between the motion compensated picture MC(X, V) before editing fed out from the motion compensator 21 and the motion compensated picture MC(X', V') tentatively fed from the motion compensator 22. The motion vector searcher 25 tentatively feeds this motion vector as motion vector V' after editing to the motion compensator 22, and feeds motion vector V' after editing which is finally obtained as a result of the search to the motion compensator 22 and the variable length coder 4. The motion compensator 22 executes motion compensation with reference to reference picture X' after editing stored in the frame memory 24 by utilizing the motion vector V' after editing tentatively fed out from the motion vector searcher 25 to tentatively obtain motion compensated picture MC(X', V') after editing. The motion compensator 22 feeds the tentatively obtained motion compensated picture MC(X', V') after editing to the motion vector searcher 25. The motion compensator 22 also executes motion compensation by utilizing the motion vector V' after editing finally fed out from the motion vector searcher 25 to finally obtain motion compensated picture MC(X', V') after editing. The motion compensator 22 feeds the finally obtained motion compensated picture MC (X', V') after editing to the adder 27 and the subtracter 28. The subtracter 28 thus subtracts the motion compensated picture MC(X', V') after editing from the decoded picture Y before editing, and feeds the difference result, i.e., picture difference (Y−MC(X', V')), to the picture difference coder 13.

The picture difference coder 13 then codes the picture difference (Y−MC(X', V')) to obtain the picture difference coded data C' after editing. The picture difference decoder 12 decodes the picture difference coded data C' after editing to obtain the picture difference D(C') after editing. The adder 27 thus adds together the picture difference D(C') after editing and the motion compensated picture MC(X', V') after editing. The sum result, i.e., the decoded data Y' after editing (refer to equation 3) is stored in the frame memory 24 for the editing of the next frame. The variable length coder 4 executes coding from the motion vector V' after editing and the picture difference coded data C' after editing, and outputs coded data (V', C') thus obtained.

Now, the edition of inter-frame predictive coded frames described above will be described in greater details in connection with P frame edition as an example by using equations.

Denoting error generated reference picture X during edition by ΔX, reference picture X' after editing is expressed by equation (4).

$$X' = X + \Delta X \qquad (4)$$

Denoting error generated in decoded data Y' after editing of P frame obtained by re-encoding in the edition (hereinafter referred to as error generated in P frame in edition) by ΔY, the error ΔY is obtained from equations 1 and 2 as motion compensated picture MC(X', C') given by equation (5).

$$\Delta Y = Y' - Y \quad (5)$$
$$= MC(X', V') - MC(X, V) + D(C') - D(C)$$

Since the difference ΔMC between the motion compensated picture MC(X, V) before editing and motion compensated picture MC(X', V') after editing is expressed by equation (3), by substituting equation (3) in equation (4), equation (6) is obtained.

$$\Delta Y = \Delta MC = D(C') - D(C) \quad (6)$$

In the first prior art example described above, the picture difference (Y−MC(X', V') of P frame is not re-encoded. Thus, picture difference coded data C before editing and picture difference coded data C' after editing are equal, and by setting C=C' in equation (6) the difference ΔY generated in P frame in edition is given as equation (7).

$$\Delta Y = \Delta MC \quad (7)$$

In other words, the difference ΔM between the motion compensated picture MC(X, V) before editing and motion compensated picture MC(X', Y') after editing is the error Y generated in P frame in edition.

In the instant case, the picture difference (Y−MC(X', V')) of P frame is re-encoded such that the error ΔY generated in P frame in the edition is reduced. Denoting the re-encoding of the picture difference (Y−MC(X', V')) of P frame by E, the picture difference coed data C' after editing is given as $$C' = E(MC-(X', V')) \quad (8)$$

Thus, by substituting equations (1) and (3) into equation (8), equation (9) is obtained.

$$C' = E(D(C) - \Delta MC) \quad (9).$$

In equation (9), if the difference ΔM between the motion compensated picture MC(X, V) before editing and the motion compensated picture MC(X', V') after editing such small that is rounded off in the re-encoding of the picture difference (Y−MC(X', V')) of P frame, the picture difference coded data C' after the edition is not changed from the picture difference coded data C before editing. Thus, the difference ΔY generated in the P frame in the edition, like that in the first prior art example in which the picture difference (Y−MC(X', V')) of theP frame is not re-encoded, is given by equation (7). The condition that the difference ΔM is such small that it is rounded off in the re-encoding of the picture difference (Y−MC(X', V')) of the P frame, represents a condition, when the re-encoding of the picture difference (Y−MC(X' , V')) of the P frame is a combination of orthogonal transform and quantization, for instance, that the orthogonal transform of the difference ΔMC is less than one half of the quantization step size.

On the other hand, in equation (9), if the difference ΔMC between the motion compensated picture MC(X, V) before editing and the motion compensated picture MC(X', V') after edition is such large that it can not be rounded off in the re-encoding of the picture difference (Y−MC(X', V')) of the P frame, the picture difference coded data C' after editing is changed from the picture difference coded data C before editing, and the picture difference D (C') after editing becomes closer to the coded picture difference (Y−MC(X', V')) compared to the picture difference D(C) before editing, that is, the magnitude relation shown in formula 10 is satisfied.

$$|D(C') - (D(C) - \Delta MC| \leq |D(C) - (D(C) - \Delta MC)| \quad (10)$$

In equation (10), the vertical line pair on each side of the inequality represents an adequate error evaluation measure such as the root of the mean square error (MSE).

By introducing equation (6) into equation (10), equation (11) is obtained.

$$|\Delta Y| \leq |\Delta MC| \quad (11)$$

In this case, compared to the case when the picture difference (Y−MC (X', V') of the P frame, the difference ΔY generated in the P frame in the edition is thus small to such extent that it is rounded off in the re-encoding of the picture difference (Y−MC(X', V') in the P frame.

From the above considerations, it will be seen that, when an error is regenerated in reference frame or frames in the edition, the error ΔY generated in inter-frame predictive coded frame can be reduced by reducing the error ΔMC between the motion compensated picture MC(X, V) before editing and the motion compensated picture MC(X', V') after editing.

In the first and second prior art examples of the moving picture editing method, the difference between the motion compensated picture MC(X', V') before editing and the motion compensated picture MC(X', V') after editing when edition operation is performed on inter-frame predictive coded frames is represented by $\Delta MC_1$ and $\Delta MC_2$, respectively. In this example of moving picture editing method, on the other hand, the difference between the motion compensated picture MC(X, V) before editing and the motion compensated picture MC(X', V') after editing when editing operation is performed on inter-frame predictive coded frames is represented by $\Delta MC0_0$.

In the operations on inter-frame predictive coded frames in the first and second prior art examples, the motion vector V before editing is used as the motion vectorv' after editing. Thus, the differences $\Delta MC_1$ and $\Delta MC_2$ are given by equation (12).

$$\Delta MC_1 = \Delta MC_2 = MC(X', V') - MC(X, V) \quad (12)$$

In contrast, in this method in the editing operation on inter-frame predictive coded frames the motion vector V' after editing corresponding to the minimum value of the difference ΔMC, equation 13 is satisfied.

$$|\Delta MC0| = \min|\Delta MC1| \leq |\Delta MC1| = |\Delta MC2| \quad (13)$$

As is seen from equation 13, the error generated in the editing operation in inter-frame predictive coded frames in this method, will not be greater than the error generated in the editing operation on inter-frame predictive coded frames in the first and second prior art examples.

Now, a case in which the error generated editing operation on inter-frame predictive coded frames in this example is reduced compared to the errors generated in editing operations on inter-frame predictive coded frames in the first and second prior art examples, will now be described.

In the editing operation on inter-frame predictive coded frames in this example, denoting the selected motion vector after editing by V'$_0$, the difference γ MC$_0$ is given by equation (14) which is obtained by changing equation (3).

$$\Delta MC_0 = MC(X', V'_0)) - MC(X, V) \quad (14)$$
$$= (MC(X', V'_0) - MC(X, V'_0) +$$
$$(MC(X', V'_0) - MC(X, V)) \approx$$
$$MC(\Delta X, V'_0) + (MC(X, V'_0) - MC(X, V))$$

In equation (14), in the last change the function MC representing the motion compensation is expanded to negative pixel value, and the rounding-off calculation is ignored. The differences $\Delta MC_1$ and $\Delta MC_2$ are given by equation (15) in the case of operation like that for the difference $\Delta MC_0$.

$$\Delta MC_1 = \Delta MC_2 \approx MC(\Delta X, V) \quad (15)$$

Now, the effect of error reduction in this example will be described by using the difference between $|\Delta MC_1|$ and $|\Delta MC_0|$.

$$||\Delta MC_1| - |\Delta MC_0|| = |MC(\Delta X, V)| - |MC(\Delta X, V0) + (MC(\Delta X, V'_0) - MC(X, V))| \quad (16)$$

By applying triangular inequality concerning the error evaluation measure $|\ |$, equation (17) can be obtained.

$$||\Delta MC_1| - |\Delta MC_0|| \geq (|MC(\Delta X, V)| - |MC(\Delta X, V'_0)| - |MC(X, V'_0) - MC(X, V)| \quad (17)$$

In equation (17), if a condition is present that the first term on the right side tends to be increased and that the second term thereof tends to be reduced, an effect of reducing error generated due to propagation of error generated in the reference frame or frames, is obtainable in the editing operation on inter-frame predictive coded frames in this example.

The magnitudes of $MC(\Delta X, V)$ is accordingly evaluated. If the motion compensation based on the motion vector V is motion compensation with an integer accuracy, $MC(\Delta X, V)$ represents what is obtained by causing parallel movement of macro-block unit divisions of picture $\Delta X$, and thus it has substantially the same magnitude as $\Delta X$ in the average. On the other hand, if the motion compensation based on the motion vector V includes motion compensation with half pixel accuracy, the half pixel accuracy motion compensation has the role of an averaging filter, and reduces the error $\Delta X$ of the reference picture. Generally, equation (18) is thus satisfied.

$$|MC(\Delta X, V)| \leq |\Delta X| \quad (18)$$

In equation (18), the difference between the two sides is the greater the more the motion vector V includes non-integer coordinate values.

Thus, in the editing operation on inter-frame predictive coded frames in this example, if the motion vector $V'_0$ after editing has more non-integer coordinate values than the motion vector V before editing has, the first term on the right side of equation (17) is increased. On the other hand, if the change in motion compensated picture in the case of changing the motion vector from the motion vector V before editing to the motion vector $V'_0$ after editing is small, the second term on the right side of equation (17) is reduced. It is thought that the above conditions are met if the following conditions ① to ③ are met.

① The change in the motion vector after editing from that before editing is small.

② Motion compensated picture of macro-blocks with the motion vectors thereof having been changed is smooth.

③ The motion vector is not changed after editing from that before editing with macro-blocks, with which motion compensated picture is not smooth.

Thus, in the case where the conditions ① to ③ are met, in equation (17) the first term on the right side is increased while the second term thereof is reduced, leading to increase of the left side. This means that in the editing operation on inter-frame predictive coded frames in this example, the error generated due to the propagation of error generated in the reference frame or frames is greatly reduced compared to the case of the first and second prior art examples.

From the above considerations, it is thought that it is highly frequently possible that the motion vector corresponding to the minimum value of the motion compensation difference before and after editing meets at least either one of the following conditions ④ and ⑤.

④ The minimum motion compensation difference motion vector is equal to motion vector before editing.

⑤ The minimum motion compensation difference motion vector is a vector in the neighborhood of motion vector before editing and has non-integer coordinate value.

As shown above, with the construction of this example, in the case when error is generated in one or two reference frames utilized for compression coding of inter-frame predictive coded frames, the motion vectors V before editing of the inter-frame predictive coded frames are searched, for the motion vector V' corresponding to the minimum value of the difference $\Delta$ MC between the motion compensated picture MC(X, V) before editing and the motion compensated picture MC(X', V') after editing (refer to equation (3). The picture difference (Y−MC(X', V')) is obtained by subtracting the motion compensated picture MC(X', V') after editing obtained by motion compensation utilizing the motion vector V' after editing from the decoded data Y before editing to obtain the picture difference coded data C' after editing, and coding is executed from the picture difference coded data C' after editing and the motion vector V' after editing. The coded data (V', C') after editing.

Thus, if the difference $\Delta MC$ is such small that it is rounded off in picture difference coding, the difference $\Delta Y$ generated in inter-frame predictive coded frames in the edition is identical with the difference $\Delta MC$. Thus, in this example, in the edition of inter-frame predictive coded frames the difference $\Delta Y$ that is generated due to propagation of the error $\Delta X$ generated in the reference picture X in the edition can be minimized.

On the other hand, if the difference $\Delta MC$ is such large that it can not be rounded off in picture difference coding, the difference $\Delta Y$ generated due to the propagation of the error $\Delta X$ generated in the reference picture X in the edition can be held within a predetermined range. In this example, in the edition of inter-frame predictive coded frames the picture quality deterioration of the inter-frame predictive coded frames, which is generated due to the propagation of the picture quality deterioration generated in the reference frame or frames, can be indefinitely reduced.

Figure 3:
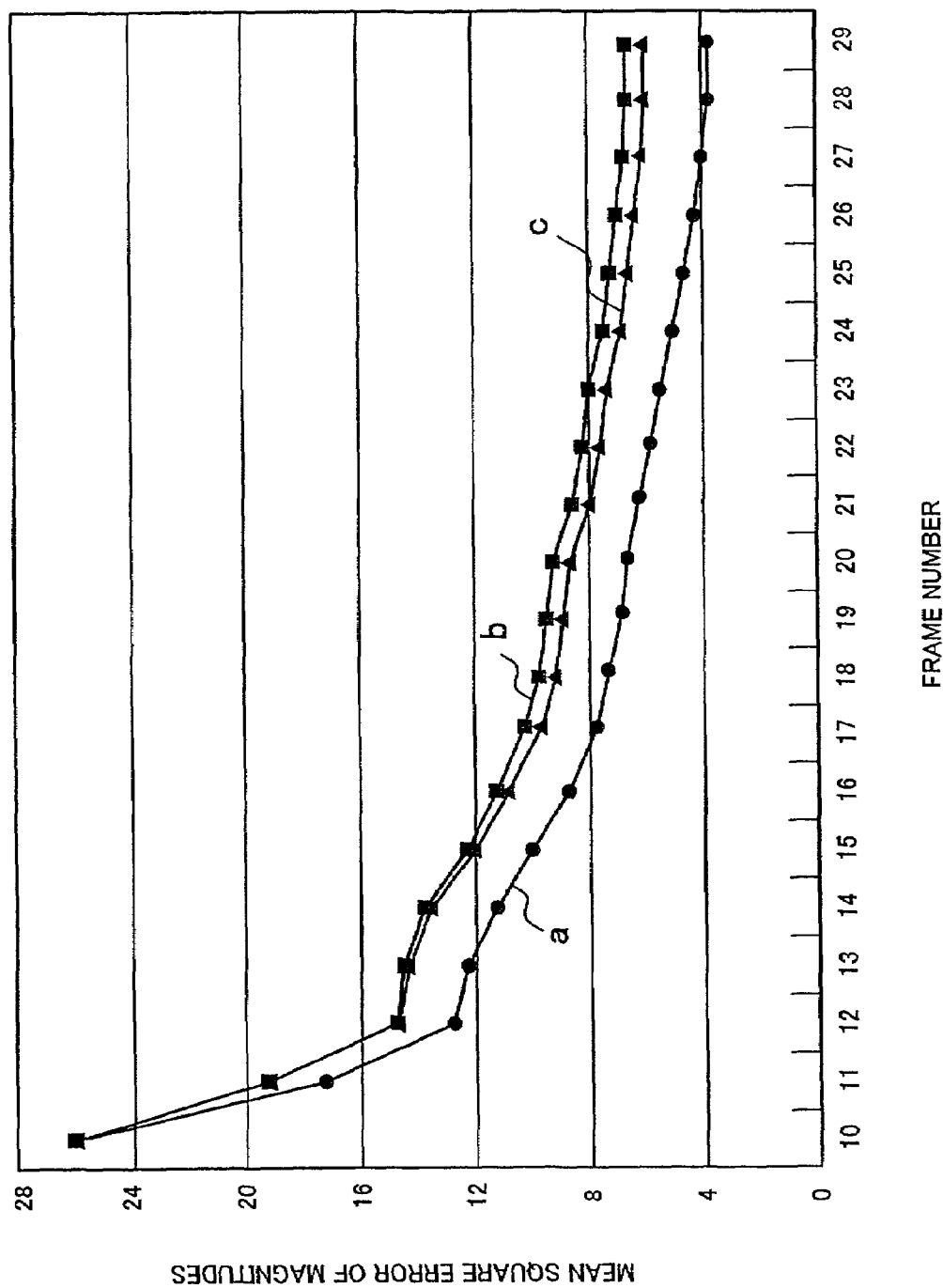
FIG. 3 shows comparison examples of mean square error measurements of the magnitudes of errors generated in the edition of actual moving pictures and prior arts methods.

FIG. 3 shows examples of mean square error measurements of the magnitudes of errors generated in the edition of actual moving pictures in this example (curve a), the first prior art example (curve b) and the second prior art example (curve c) of the moving picture editing method. In the editing operation, frames of frame number 10 and following frame numbers are extracted from moving pictures, in which only the first frame is I frame and the other frames are all P frames. The error generated in the frame of frame number 10 is re-encoding error due to re-encoding of the frame to I frame. In either of these moving picture editing methods, the error generated in the edition is reduced with increasing frame number due to the effect of the half pixel motion compensation as averaging filter. It will be seen from FIG. 3 that the error generated in inter-frame predictive coded frame is minimum in the case of using this example of the moving picture editing method.

A second embodiment of the present invention will now be described.

Figure 4:
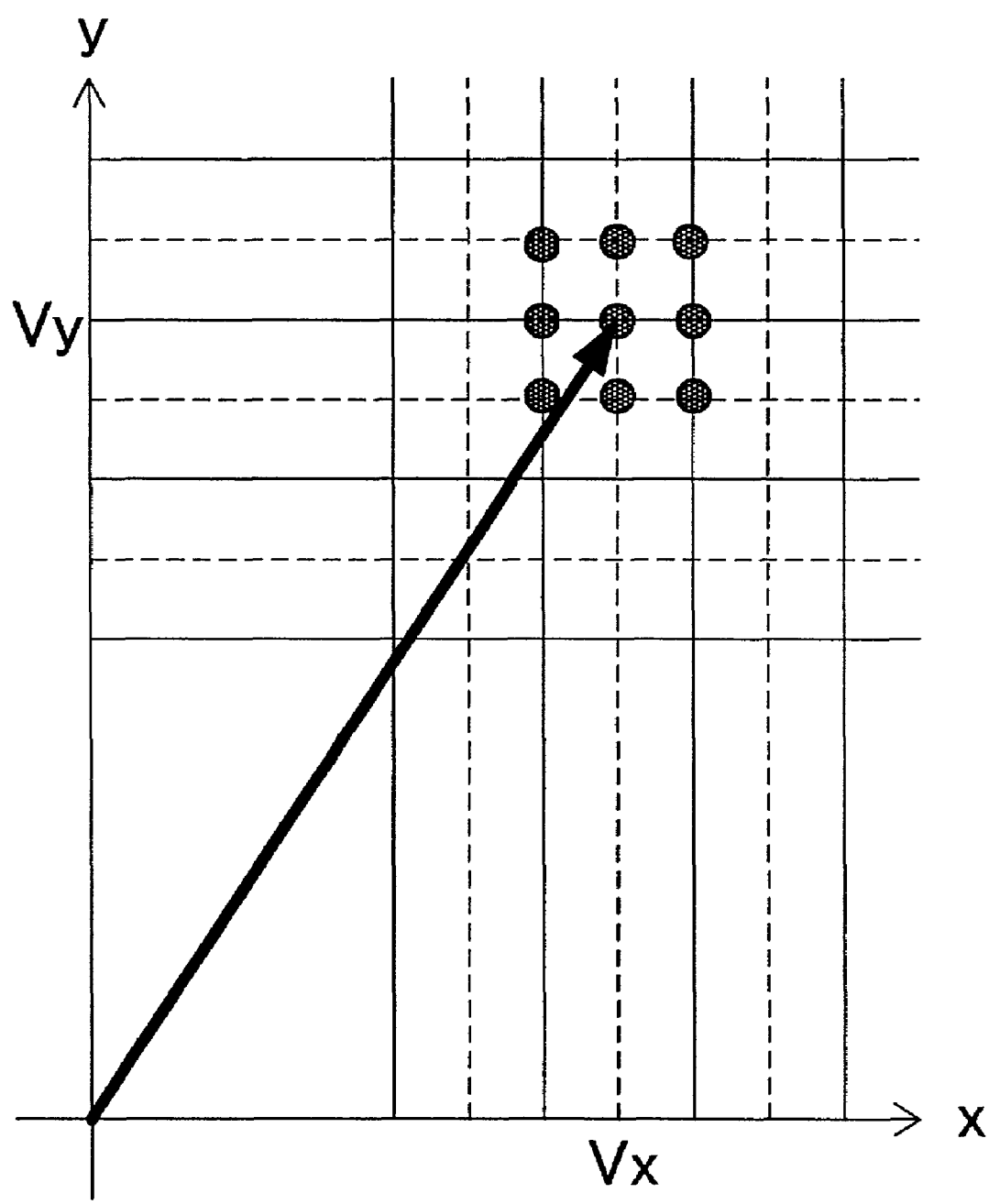
FIG. 4 is a drawing for explaining the moving picture editing method according to a second embodiment of the present invention.

The second embodiment of the moving picture editing method according to the present invention adopts moving picture editing system, which is substantially the same in construction as the moving picture editing system used in the above first embodiment of the moving picture editing method. In the second embodiment of the moving picture editing method, however, the range of the motion vector search which is performed in the motion vector searcher 25 in the editing operation on inter-frame predictive coded frames in the previous first embodiment, is limited to motion vectors present in a predetermined region in the neighborhood of motion vector V before editing. FIG. 4 shows an example of the motion vector search range. In FIG. 4, the arrow represents motion vector V before editing. Nine black circles represent the motion vector search range, solid lines represent integer coordinate values, and dashed lines represent (integer+½) coordinate values.

In this example, as noted before, the range of motion vector search in the motion vector searcher 25 is limited, and the necessary computational effort is thus reduced compared to the case of the first embodiment described above. However, since the motion vector corresponding to the minimum value of the difference $\Delta$ MC between the motion compensated picture MC(X, V) before editing of inter-frame predictive coded frames and the motion compensated picture MC(X', V') after editing of the frames is concentrated in the neighborhood of the motion vector V before editing, the error is not greatly increased compared to the case of the first embodiment.

A third embodiment of the present invention will now be described.

Figure 5:
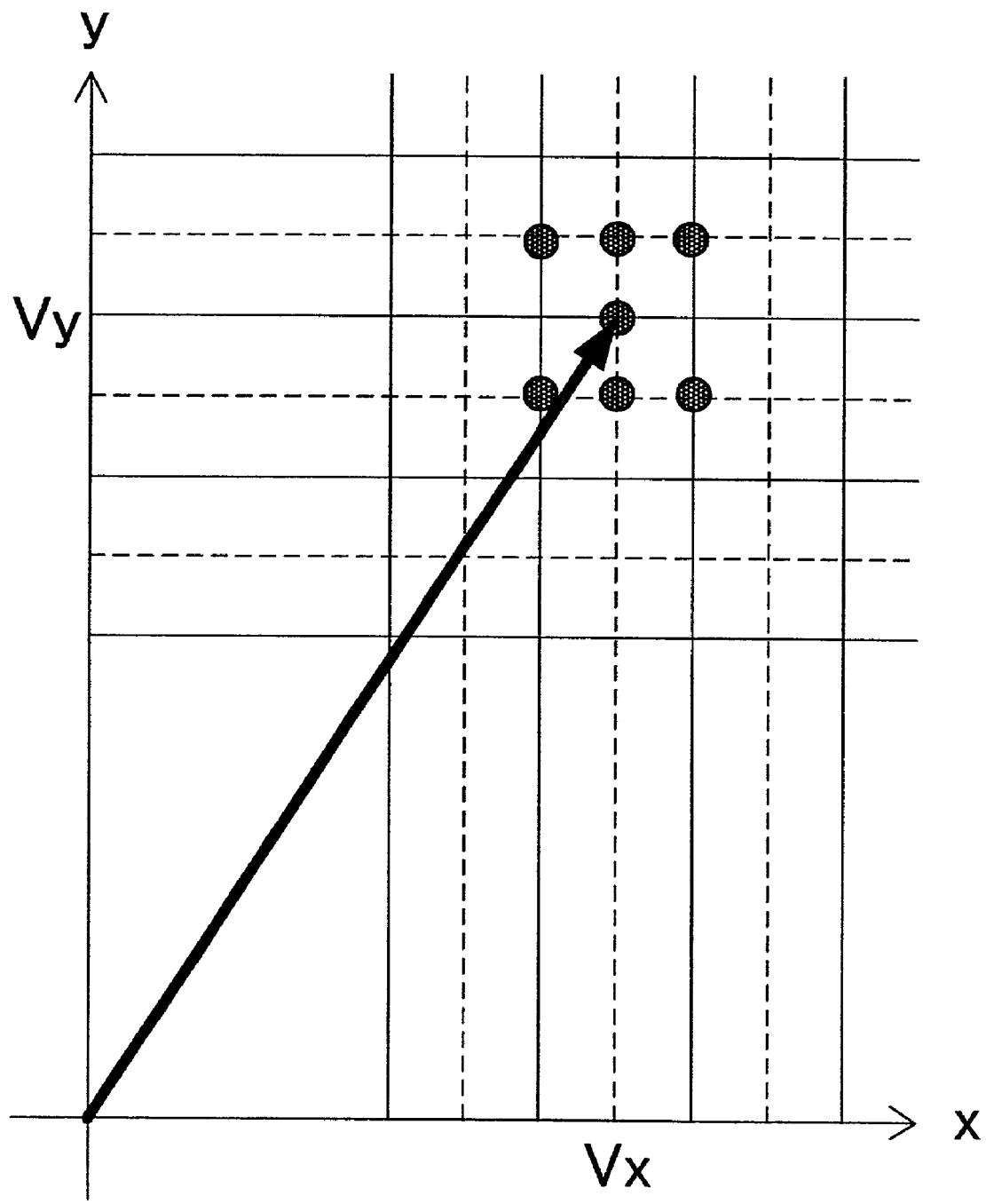
FIG. 5 is a drawing for explaining the moving picture editing method according to a third embodiment of the present invention.

The third embodiment of the moving picture editing method according to the present invention adopts a moving picture editing system, which is substantially the same in construction as the moving picture editing system used in the third embodiment of the present invention. In the third embodiment of the moving picture editing method, the range of the motion vector search in the motion vector searcher 25 in the editing operation on inter-frame predictive coded frames in the previous first embodiment, is limited to the same motion vectors as the motion vectors V before editing or to motion vectors, which are present in a predetermined range in the neighborhood of motion vector V before editing and have non-integer horizontal or vertical coordinate values. FIG. 5 shows an example of the motion vector search range. In FIG. 5, the arrow represents motion vector V before editing. Seven black circles represent the motion vector search range, solid lines represent integer coordinate values, and dashed lines represent (integer+½) coordinate values.

In this example, as noted before, the range of the motion vector search in the motion vector searcher 25 is limited, and the necessary computational effort is reduced compared to the case of the first embodiment described before. However, since the motion vector corresponding to the minimum value of the difference $\Delta$ MC between the motion compensated MC(X, V) before editing Of inter-frame predictive coded frames and the motion compensated picture MC(X', V') after editing of the frames is either the same ads motion vector V before editing or is concentrated in a range of motion vectors having non-integer coordinate values in the neighborhood of motion vector V before editing, the error is not greatly increased compared to the case of the first embodiment.

A fourth embodiment of the present invention will now be described.

Figure 6:
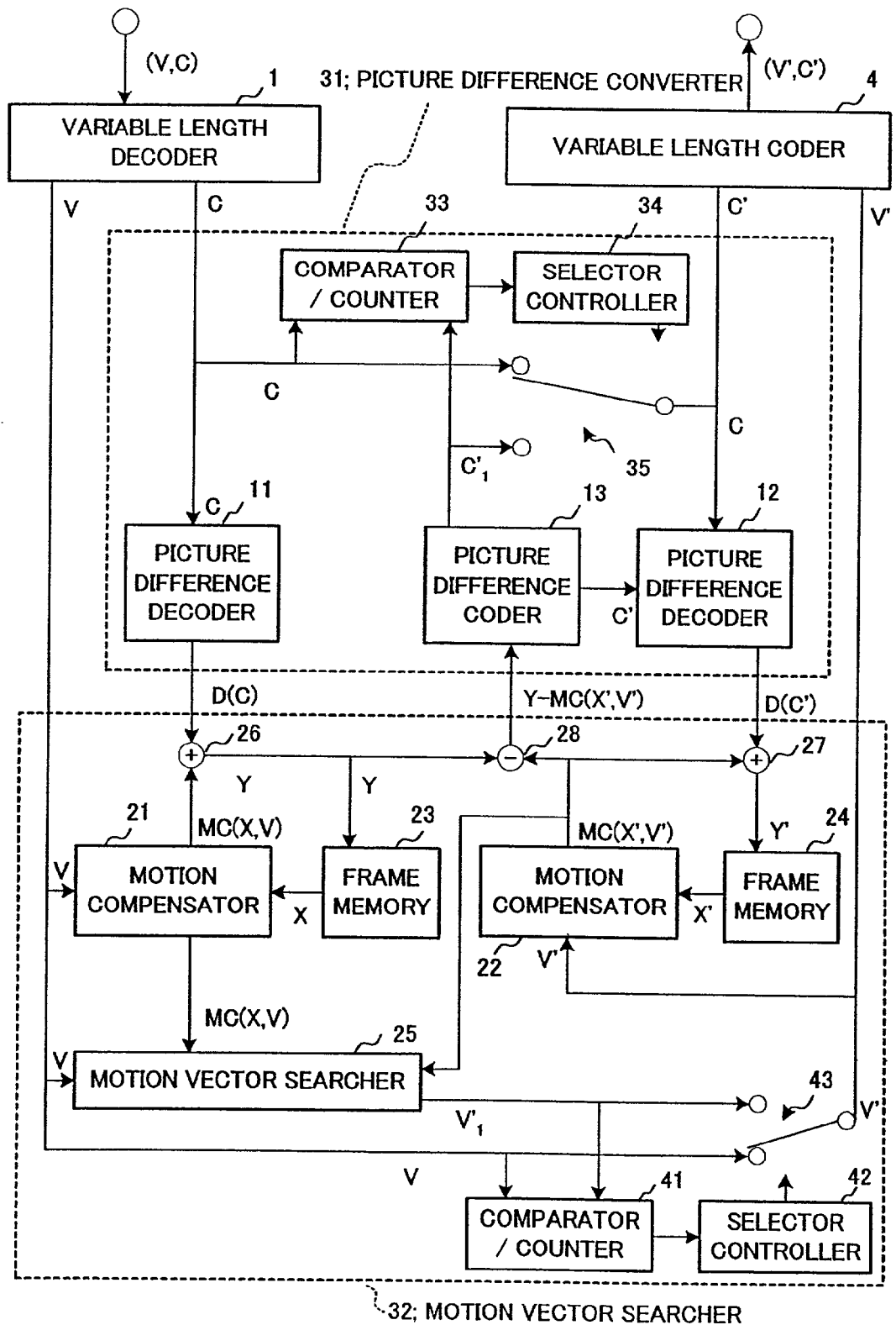
FIG. 6 is a block diagram showing the construction of an inter-frame predictive coding frame processor in a moving picture editing system implementing a fourth embodiment of the moving picture editing method according to the present invention.

FIG. 6 is a block diagram showing the construction of a moving picture editing system, which is adopted in the fourth embodiment of the moving picture editing method according to the present invention. In the Figure, parts like those in FIG. 1 are designated by like reference numerals, and their description is no longer given. The illustrated moving picture editing system comprises a picture difference converter 31 and a motion vector converter 32, these converters being provided in lieu of the picture difference converter 2 and the motion vector converter 3, respectively, shown in FIG. 1.

The picture difference converter 31 includes, in addition to the picture difference converter 32 shown in FIG. 1, a comparator/counter 33, a selector controller 34 and a selector 35. The comparator/counter 33 functions that, when editing operation on inter-frame predictive coded frames is performed with the selection of a first picture difference data converting method, to be described later, by the selection controller 34, it compares picture difference coded data $C'_1$ after editing fed out from the picture difference coder 13 and picture difference coded data C before editing, and also counts macroblocks concerning and different in number with the picture difference coded data $C'_1$ and C after and before editing, respectively. The comparator/counter 33 feeds the resultant count data to the selection controller 34. The selector controller 34 switches the selector 35 by selecting, under CPU control, either of a first picture difference data converting method, in which as picture difference coded data C' after editing is used picture difference coded data $C'_1$ after editing obtained as a result of re-encoding, in the picture difference coder 13, of picture difference (Y−MC(X', V')) obtained as a result of subtraction, in the subtracter 28, of motion compensated picture MC(X', V') after editing from decoded picture Y before editing, and a second picture difference data converting method, in which picture difference coded data C before editing is used without changing but directly. The selector controller 34 has a memory for storing the count data fed out from the comparator/counter 33. The selector 35 is switched by the selector controller 34, and feeds either the picture difference coded data C before editing fed out from the variable length coder 1 or the picture difference coded data $C'_1$ after editing fed out from the picture difference coder 13 as the picture difference coded data C' after editing to the picture difference decoder 12 and the variable length coder 4.

The motion vector converter 32 includes, in addition to the construction of the motion vector converter 3 shown in FIG. 1, a comparator/counter 41, a selector controller 42 and a selector 43. The comparator/counter 41 functions such that, when editing operation on inter-frame predictive coded frames is performed with the selection of a first motion vector determining method, to be described later, by the selector controller 42, it compares motion vector V before editing fed out from the variable length decoder 1 and motion vector $V'_1$ fed out as a search result from the motion vector searcher 25, and also counts macroblocks concerning and different in number with the motion vectors $V'_1$ and V. The comparator/counter 41 feeds out the resultant count data to the selector controller 42. The selector controller 42 selects, under CPU control, either a first motion vector determining method, in which the search result motion vector V'₁ fed out from the motion vector searcher 25 is used ads motion vector V' after editing, or a second motion vector determining method, in which the motion vector V before editing is used without change but directly. The selector controller 42 has a memory for storing the count data fed out from the comparator/counter 41. The selector 43 is switched by the selector controller 42 to select the motion vector V before editing fed out from the variable length decoder 1 or the search result motion vector V'₁ fed out from the motion vector searcher 25, the selected motion vector being fed as motion vector BV' after editing to the motion compensator 22 and the variable length coder 4.

Now, as editing operation of the CPU in the moving picture editing system having the above construction, the processing of controlling inter-frame predictive coded frame processor in the case of error generation in one or two reference frames utilized for the compression coding of a certain inter-frame predictive coded frame, will be described in details with reference to the flow charts of FIGS. 7 to 11. The editing operation and other operations of the CPU are substantially the same as the processing shown in FIG. 2 executed in the first embodiment described above except for the process in step SA8, and the description is no longer given.

First, details of the inter-frame predictive coded frame processing will be described with reference to the flow chart shown in FIG. 7.

In step SB1, the CPU checks whether it is necessary to change the motion vector V' after editing from the motion vector V before editing. If the check result is "NO", the CPU controls the selector controller 42 to select the second motion vector determining method, and then executes step SB2. The selector 43 is thus switched under control of the selector controller 42 to select the motion vector V before editing fed out from the variable length coder 1, and feeds the selected motion vector V before editing as motion vector V' after editing to the motion compensator 22 and the variable length coder 4. In step SB2, the CPU checks whether it is necessary to change the picture difference coded data C' after editing from the picture difference coded data C before editing. If the check result is "NO", the CPU controls the selector controller 34 to select the second picture difference data converting method, and then executes step SA9 shown in FIG. 2. The selector 35 is thus switched by the selector controller 34 to select the picture difference coded data C before editing fed out from the variable length decoder 1, and feeds the selected picture difference coded data C before editing as the picture difference coded data C' after editing to the picture difference decoder 12 and the variable length coder 4. In step SA9, the CUP thus causes the coded data (V, C) before editing to be outputted directly as the coded data (V', C') after editing of the pertinent frame.

If the check result in step SB1 is "YES", on the other hand, that is, if it is necessary to change the motion vector V' after editing form the motion vector V before editing, the CPU controls the selector controller 42 to select the first motion vector determining method, in which the search result motion vector V'₁ fed out from the motion vector searcher 25 is used as the motion vector V' after editing, and then executes step SB2. The selector 43 is thus switched by the selector controller 42 to select the search result motion vector V'₁ fed out from the motion vector searcher 25 and feed the selected selected search result motion vector V'₁ as the motion vector V' after editing to the motion compensator 22 and the variable length coder 4.

In step SA3, the CPU controls the motion vector searcher 25 and the motion compensator 22 to search motion vectors in a range centered on each motion vector V before editing, for a motion vector corresponding to the minimum value of the difference ΔMC the motion compensated picture MC(X, V) before editing fed out from he motion compensator 21 and the motion compensated picture MC (X', V') after editing tentatively fed out from the motion compensator 22. The CPU causes the searched minimum difference motion vector to be fed as the tentative motion vector V' after editing via the selector 43 to the motion compensator 22, and also causes the motion vector V' after editing finally obtained as a result of the search via the selector 43 to the motion compensator 22 and the variable length coder 4. The CPU then executes step SB4. The motion compensator 22 executes motion compensation with reference to the reference picture X' after editing stored in the frame memory 24 by utilizing the motion vector V' tentatively fed out from the motion vector searcher 25 to tentatively obtain the motion compensated picture MC(X', V') after editing, and feeds the tentatively obtained motion compensated picture MC(X', V') after editing to the motion vector searcher 25.

In step SB4, the CPU controls the comparator/counter 41 to compare the motion vector V before editing fed out from the variable length decoder 1 and the search result motion vector V'₁ fed out from the motion vector searcher 25 and count macroblocks concerning and different in number with the motion vectors V'₁ and V, the resultant count data being fed to the selector controller 42. The CPU then executes step SB5. In step SB5, the CPU checks whether it is necessary to change the picture difference coded data C' after editing from the picture difference coded data C before editing. If the check result is "NO", the CPU controls the selector controller 34 to select the second picture difference data converting method, and then executes step SA9. The selector 35 is thus switched by the selector controller 34 to select the picture difference coded data C before editing fed out from the variable length decoder 1, the selected picture difference coded data C before editing being fed as the picture difference coded data C' after editing to the picture difference decoder 12 and the variable length coder 4. The variable length decoder 4 thus executes coding of the motion vector V' (V'1) after editing fed out from the motion vector searcher 25 via the selector 43 and the picture difference coded data C' (C) after editing fed out from the variable length decoder 12 via the selector 35 to obtain and output thecodeddata (V', C') afterediting. Thus, instep SA9, the CPU outputs the coded data (V', C') after editing as the coded data (V', C') after editing of the pertinent frame.

If the check result in step SB5 is "YES", that is, if it is necessary to change the picture difference coded data C' after editing from the picture difference coded data C before editing, the CPU controls the motion compensator 22 to execute motion compensation by utilizing the motion vector V' after editing finally fed out from the motion vector searcher 25 and finally obtain the motion compensated picture MC(X', V') after editing, and also controls the selector controller 34 to select the first picture difference data converting method. The CPU then executes step SB6. The subtracter 28 thus subtracts the motion compensated picture MC(X', V') after editing fed out from the motion compensator 22 from the decoded data Y before editing fed out from the adder 26, and feeds the difference result thus obtained i.e., the picture difference (Y−MC(X', V')) to the picture difference coder 13. The selector 35, switched under control of the selector controller 34, selects the picture difference coded data C'₁ after editing fed out from the picture difference coder 13, and feeds the selected picture difference coded data C'₁ after editing as the picture difference coded data C' after editing to the picture difference decoder 12 and the variable length coder 45.

If the check result in step SB2 is "YES", that is, if it is necessary to change the picture difference coded data C' after editing from the picture difference coded data C before editing, the CPU controls the motion compensator 22 to execute motion compensation by utilizing the motion vector V' (V) after editing fed out from the variable length decoder 1 via the selector 43 to obtain the motion compensated picture MC(X', V') after editing and feed the obtained motion compensated picture as the motion compensated picture MC(X', V') after editing to the adder 27 and the subtracter 28. The CPU also controls the selector controller 34 to select the first picture difference data converting method. Then, the CPU executes step SB6. The subtracter 28 thus subtracts the motion compensated picture MC(X', V') after editing fed out from the motion compensator 22 from the decoded data Y before editing fed out from the adder 26, and feeds the resultant difference, i.e., the picture difference (Y−MC(X', V')) to the picture difference coder 13. The selector 35 is switched under control of the selector controller to select the picture difference coded data C'$_1$ after editing fed out from the picture difference coder 13, and feeds the selected picture difference coded data as the picture difference coded data C' after editing to the picture difference decoder 12 and the variable length coder 4.

In step SB6, the CPU controls the picture difference coder 13 to code the picture difference (Y−MC(X', V')) and thus obtain the picture difference coded data C'$_1$ after editing. Then, the CPU executes step SB7. The picture difference coder 13 thus codes the picture difference (Y−MC(X', V')) and thus obtain the picture difference coded data C'$_1$ after editing, and feeds the obtained picture difference coded data via the comparator/counter 33 and the selector 55 to the picture difference decoder 12 and the variable length coder 4. In step SB7, the CPU controls the comparator/counter 33 to compare the picture difference coded data C'$_1$ after editing fed out from the picture difference coder 13 and the picture difference coded data C before editing and also count macroblocks concerning and different in number with the picture difference coded data C'$_1$ and C, the resultant count data being fed to the selector controller 34. Then, the CPU executes step SA9 shown in FIG. 2. Thus, variable length coder 4 executes coding from the motion vector V' (V) after editing fed out from the motion vector searcher 25 via the selector 43 or the motion vector V'(V) after editing fed out from the variable length decoder 1 via the selector 43 and the picture difference coded data C' (C'$_1$) after editing fed out from the picture difference coder 13 via the selector 35, and outputs the coded data (V', C') after editing thus obtained. In step SA9, the CPU thus causes output of the coded data (V'$_1$, C'$_1$) after editing or (V, C'$_1$) as the coded data (V', C') after editing of the pertinent frame.

Now, the process in step SB1 shown in FIG. 7, i.e., the V change checking process for checking whether it is necessary to change the motion vector V' after editing from the motion vector V before editing, will be described with reference to the flow chart shown in FIG. 8.

First, in step SC1, the CPU¥ checks whether the inputted decoded data Y before editing is of B frame. When the check result is "YES", the CPU executes step SC2. In step SC2, the CPU sets two reference frames of the decoded data Y before editing to be frames X$_1$ and X$_2$, and then executes step SC3. In step SC3, the CPU checks whether the CPU checks whether frame X$_1$ meets a predetermined condition α. The condition will be described later. If the result of this check is "YES", the CPU executes step SC4. In step SC4, the CPU checks whether frame X$_2$ meets the predetermined condition α. If the result of this check is "YES", the CPU determines that it is unnecessary to change the motion vector V' after editing from the motion vector V before editing, and executes step Sb2.

If the check result in step SD3 is "NO", that is, the frame X$_1$ fails to meet the predetermined condition α, the CPU determines that it is necessary to change the motion vector V' after editing from the motion vector V before editing, and executes step SB3. If the check result in step SC4 is "NO", that is, the frame X$_2$ fails to meet the predetermined condition, the CPU determines that it is necessary to change the motion vector V' after editing from the motion vector V before editing, and executes step SB3 in FIG. 7.

If the check result in step SC1 is "NO", that is, if the inputted decoded data Y before editing is not of B frame but of P frame, the CPU executes step SC5. In step SC5, the CPU sets one reference frame of the decoded data Y before editing to be frame X, and executes step SC6. In step SC6, the CPU checks whether the frame X meets the predetermined condition α is met. If the result of this check is "YES", the CPU determines that it is unnecessary to change the motion vector V' after editing from the motion vector V before editing, and executes step SB2 shown in FIG. 7.

Figure 7:
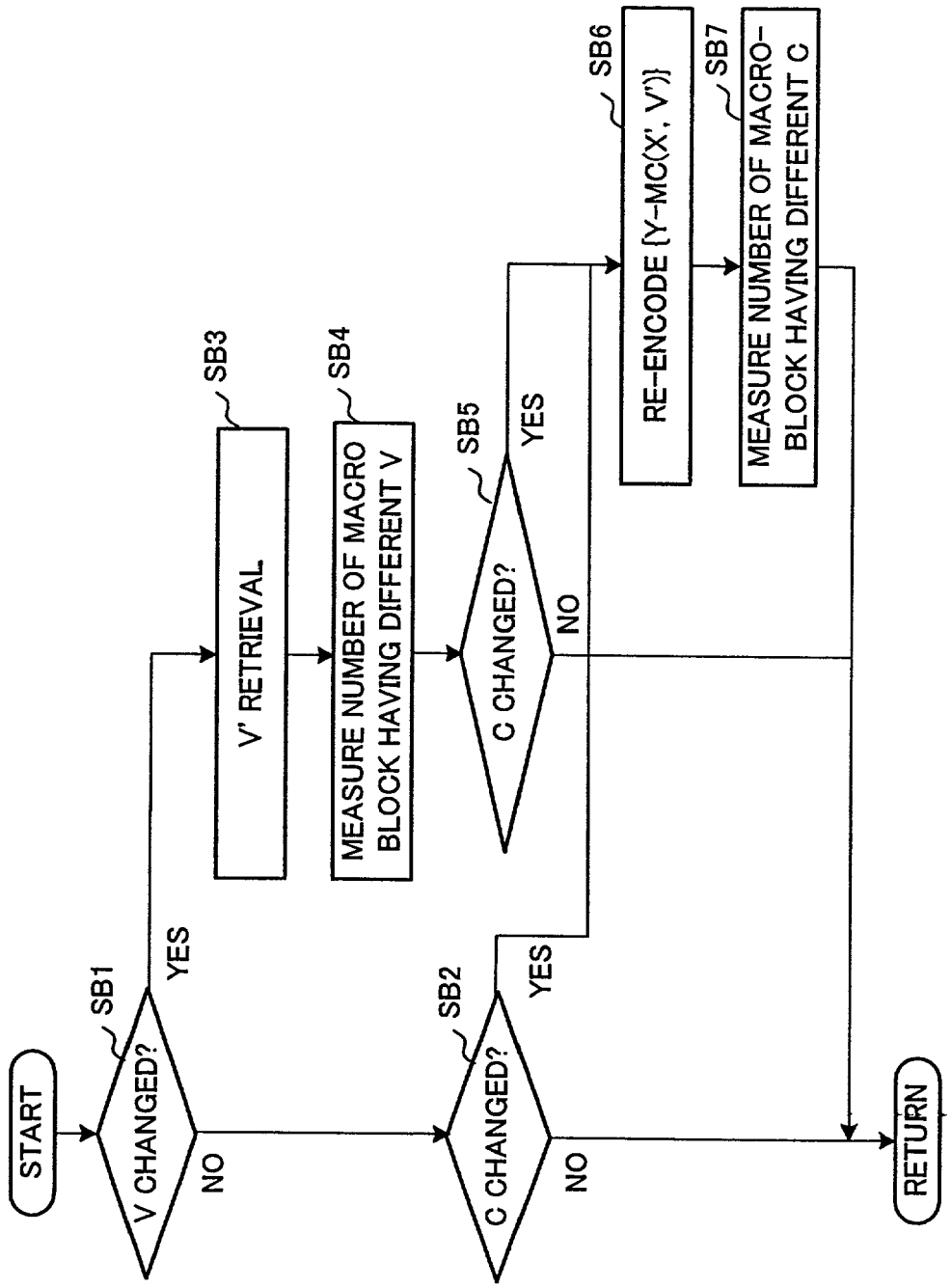
FIGS. 7 to 11 are flow charts representative of operation examples of CPU in the system of the present invention.
Figure 8:
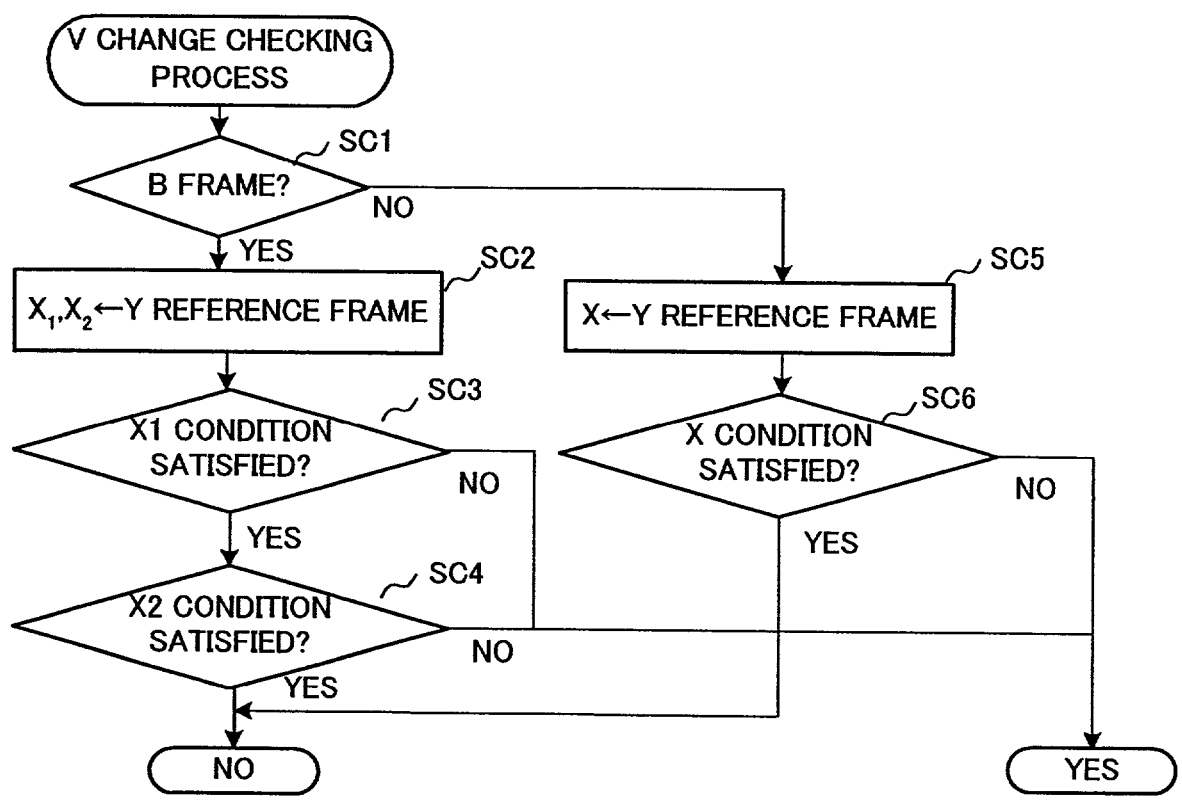

If the check result in step SC6 is "NO", that is, if the frame X fails to meet the predetermined condition α, the CPU determines that it is necessary to change the motion vector V' after editing from the motion vector V before editing, and executes step SB3 shown in FIG. 7.

Figure 9:
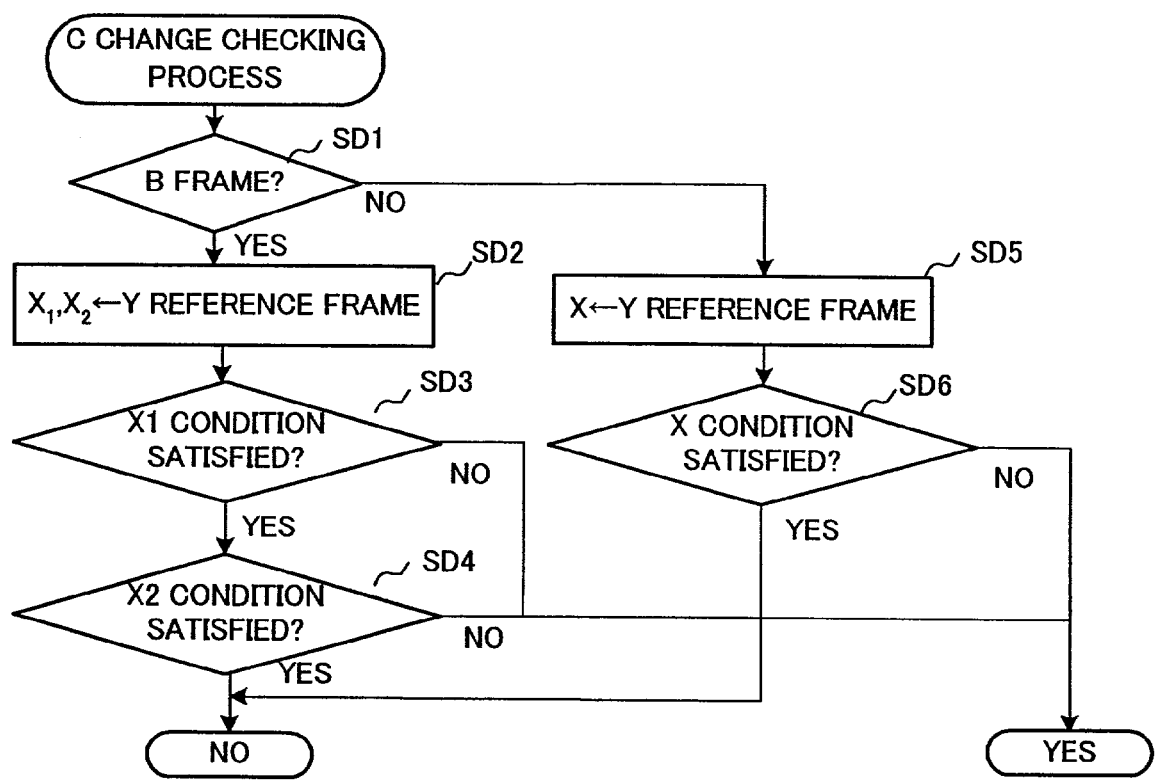

Now, the processing in steps SB2 and SB5 shown in FIG. 7, that is, the C change check processing of checking whether it is necessary to change the picture difference coded data C' after editing from the picture difference coded data C before editing, will be described with reference to the flow chart shown in FIG. 9.

First, in step SD1, the CPU checks whether the inputted decoded data Y before editing is of B frame. If the result of this check is "YES", the CPU executes step SD2. In step SD2, the CPU sets two reference frames of the decoded data Y before editing to be frames X$_1$ and X$_2$, and then executes step SD3. In step SD3, the CPU checks whether the frame X$_1$ meets the predetermined condition β. The condition β will be described later. If the check result is "YES", the CPU executes step SD4. In step SD4, the CPU checks whether the frame X$_2$ meets the predetermined condition β. If the check result is "YES", the CPU determines that it is unnecessary to change the picture difference coded data C' after editing from the picture difference coded data C before editing, and executes step SA9 in FIG. 2.

If the check result in step SD3 is "NO", that is, if the frame X$_1$ fails to meet the predetermined condition β, the CPU determines that it is necessary to change the picture difference coded data C' after editing from the picture difference coded data C before editing, and executes step SB6 shown in FIG. 7. If the check result in step SD4 is "NO", that is, if the frame X2 fails to meet the predetermined condition β, the CPU determines that it is necessary to change the picture difference coded data C' after editing from the picture difference coded data C before editing, and executes step SB6 in FIG. 7.

If the check result in step SD1 is "NO", that is, the inputted decoded data Y before editing is not of B frame but of P frame, the CPU executes step SD5. In step SD2, the CPU sets one reference frame of the decoded data Y before editing to be frame X, and then executes step SD6. In step SD6, the CPU checks whether the frame X meets the predetermined condition β. If the check result is "YES", the CPU determines that it is unnecessary to change the picture difference coded data C' after editing from the picture difference coded data C before editing, and executes step SA9.

If the check result in step SD6 is "NO", that is, if the frame C fails to meet the predetermined condition β, the CPU determines that the picture difference coded data C' after editing from the picture difference coded data C before editing, and executes step SB6 shown in FIG. 7.

Figure 10:
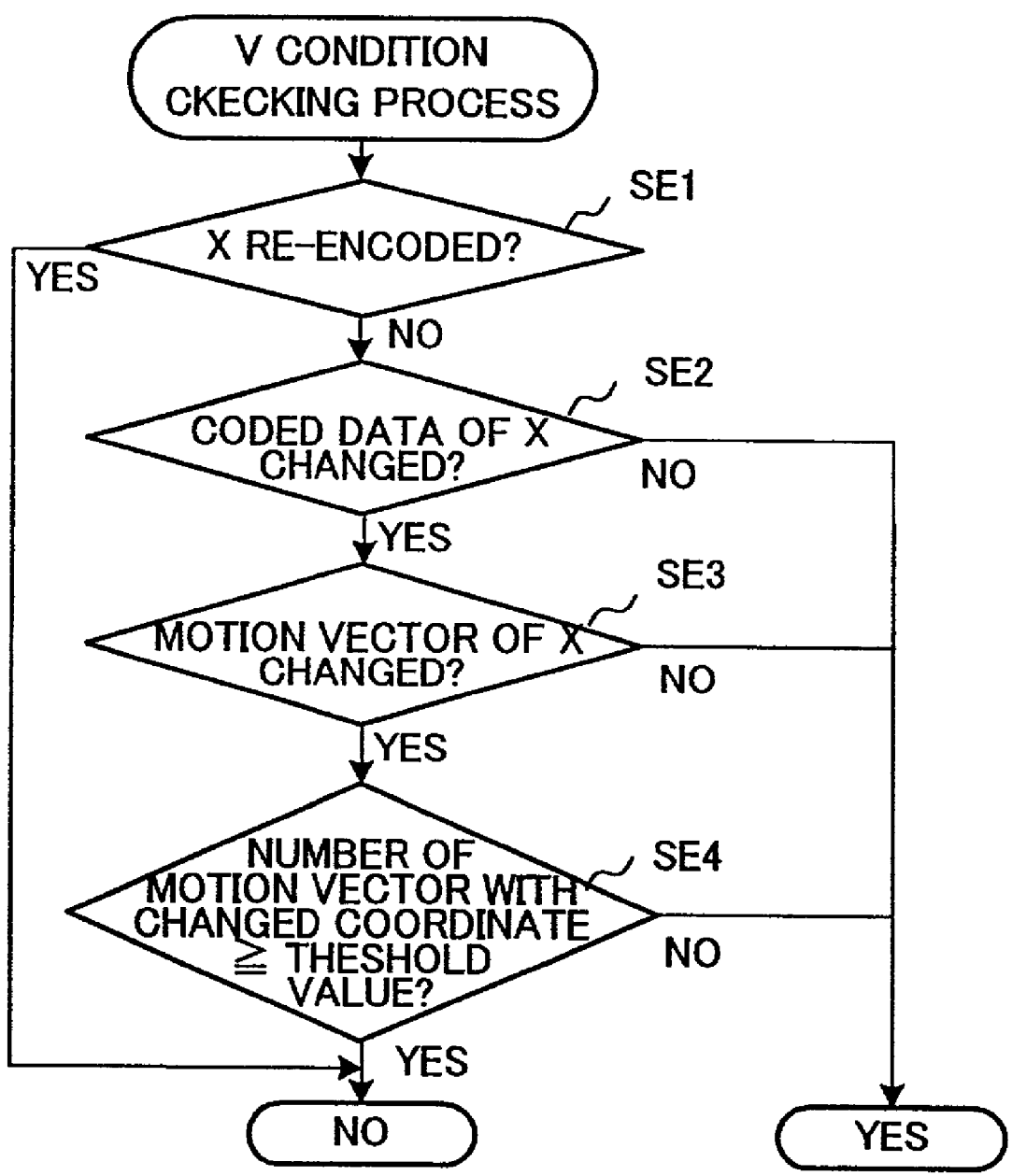

Now, the processing in steps SC3, SC4 and SC6 shown in FIG. 8, that is, the V condition check processing of checking whether the frame $X_1$, $X_2$ or X meets the predetermined condition α, will be described with reference to the flow chart of FIG. 10. The following description will be made in connection with typically the frame X as the frame $X_1$, $X_2$ or X.

First, in step SE1, the CPU checks whether the frame X has been re-encoded in the edition. If the check result is "YES", it means the generation of an error in the frame X due to the re-encoding, and the CPU thus determines that the frame X fails to meet the predetermined condition α.

If the check result in step SE1 is "NO", that is, if the frame X has not been re-encoded in the edition, the CPU executes step SE2. In step SE2, the CPU checks whether the coded data of the frame X has been changed in the edition. If the check result is "NO", it is thought that the error generated in the frame X due to the edition is small so that error generated in the decoded data Y before editing will not be reduced by the edition even by changing the motion vector V of the decoded data Y before editing with reference had to the frame X, and the CPU determines that the frame X meets the predetermined condition α.

If the check result in step SE2 is "YES", on the other hand, that is, if the coded data of the frame X has been changed, the CPU executes step SE3. In step SE3, the CPU checks whether the first motion vector determining method has been selected and the motion vector V has been changed in the edition with the frame X. If the result of this check is "NO", it is thought that the second motion vector determining method has been selected, and that the error generated in the frame X due to the edition is small so that error generated in the decoded data Y before editing will not be reduced by the edition even by changing the motion vector V of the decoded data Y before editing with reference had to the frame X, and the CPU thus determines that the frame X meets the predetermined condition α.

If the check result in step SE3 is "YES", that is, if the first motion vector determining method has been selected and the motion vector V has been changed in the edition with the frame X, the CPU executes step SE4. In step SE4, the CPU controls the comparator/counter 41 to compare the motion vector V before editing fed out from the variable length decoder 1 and the search result motion vector V'$_1$ fed out from the motion vector searcher 25 and count macroblocks concerning and different in number with the motion vectors V'$_1$ and V. The CPU also reads out the count result data from the memory in the selector controller 42, and checks whether the count result is greater than a predetermined threshold number. If the result of this check is "NO", it is thought that while the first motion vector determining method has been selected, the numbers of the macroblocks concerning and different in number with the motion vectors V'$_1$ and V are less than the threshold number and error generated in the frame X due to the edition is small so that error generated in the decoded data Y before editing in the edition will not be reduced even by changing the motion vector V of the decoded data Y before editing with reference had to the frame X, and the CPU thus determines that the frame X meets the predetermined condition .

If the check result in step SE4 is "YES", that is, if the first motion vector determining method has been selected and the numbers of macroboocks concerning and different in number with the motion vectors V'1 and V are greater than the predetermined threshold number, the CPU determines that the frame X fails to meet the predetermined condition.

Figure 11:
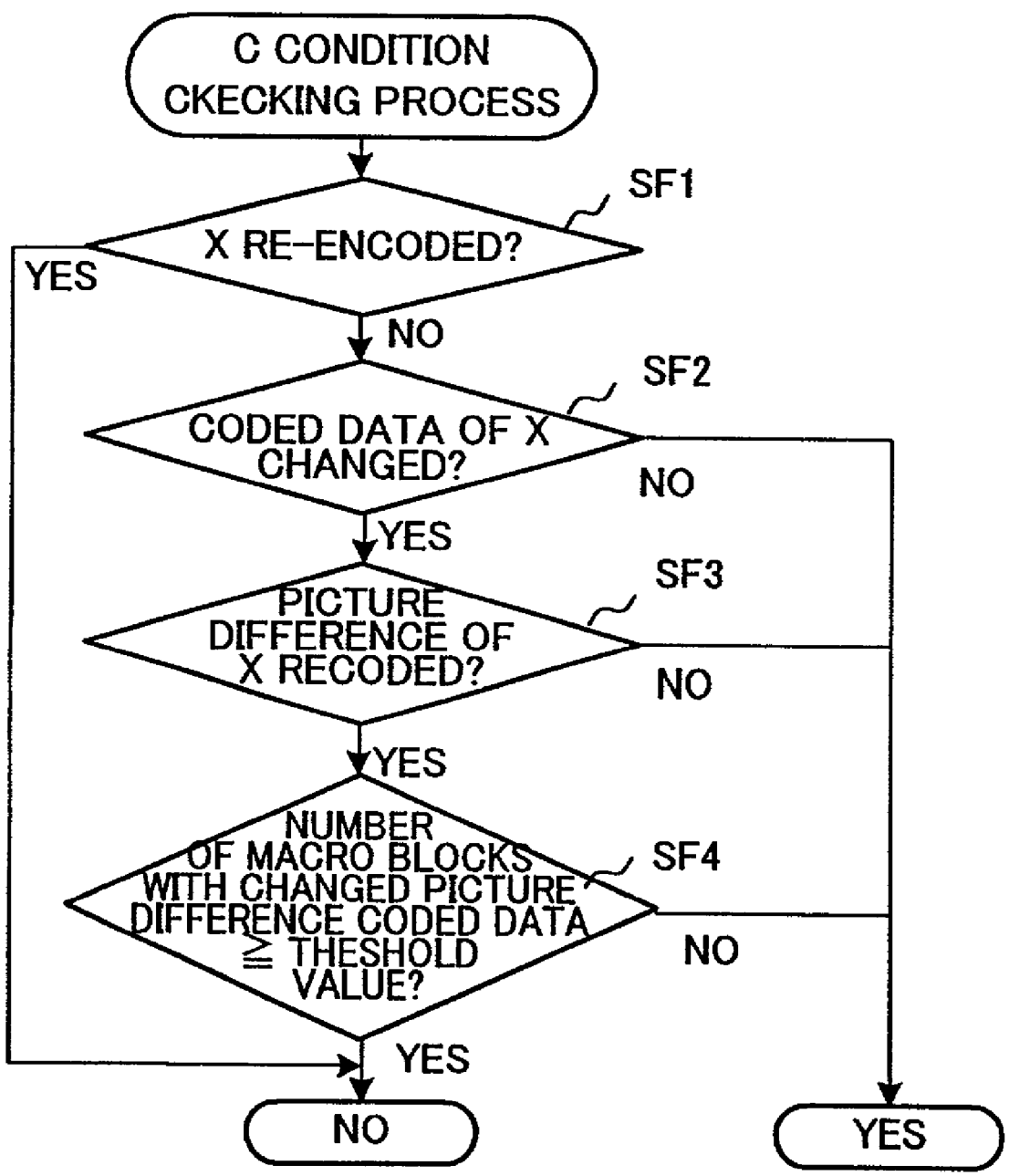
Figure 12:
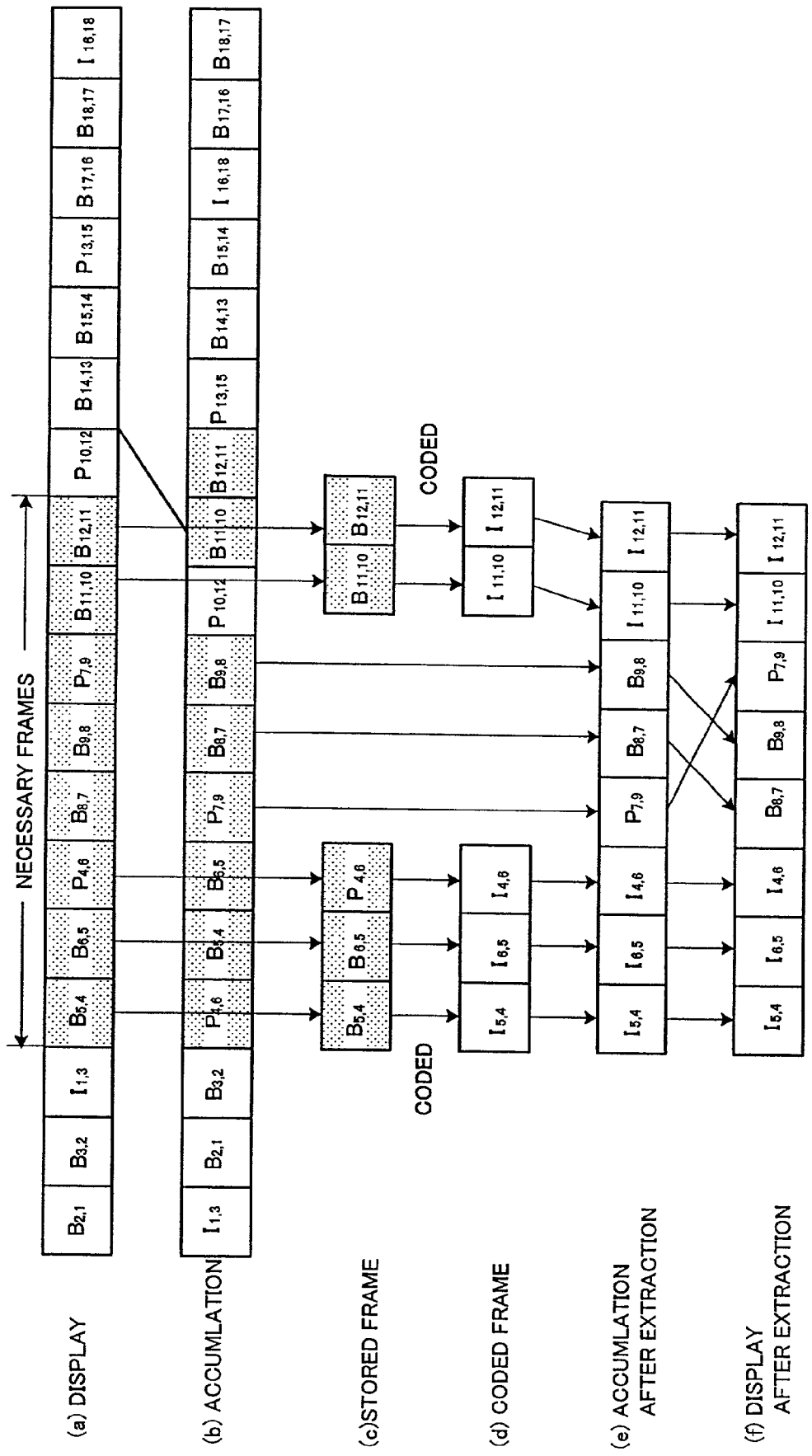
FIG. 12 is a drawing for explaining the moving picture editing method according to a first prior art.
Figure 13:
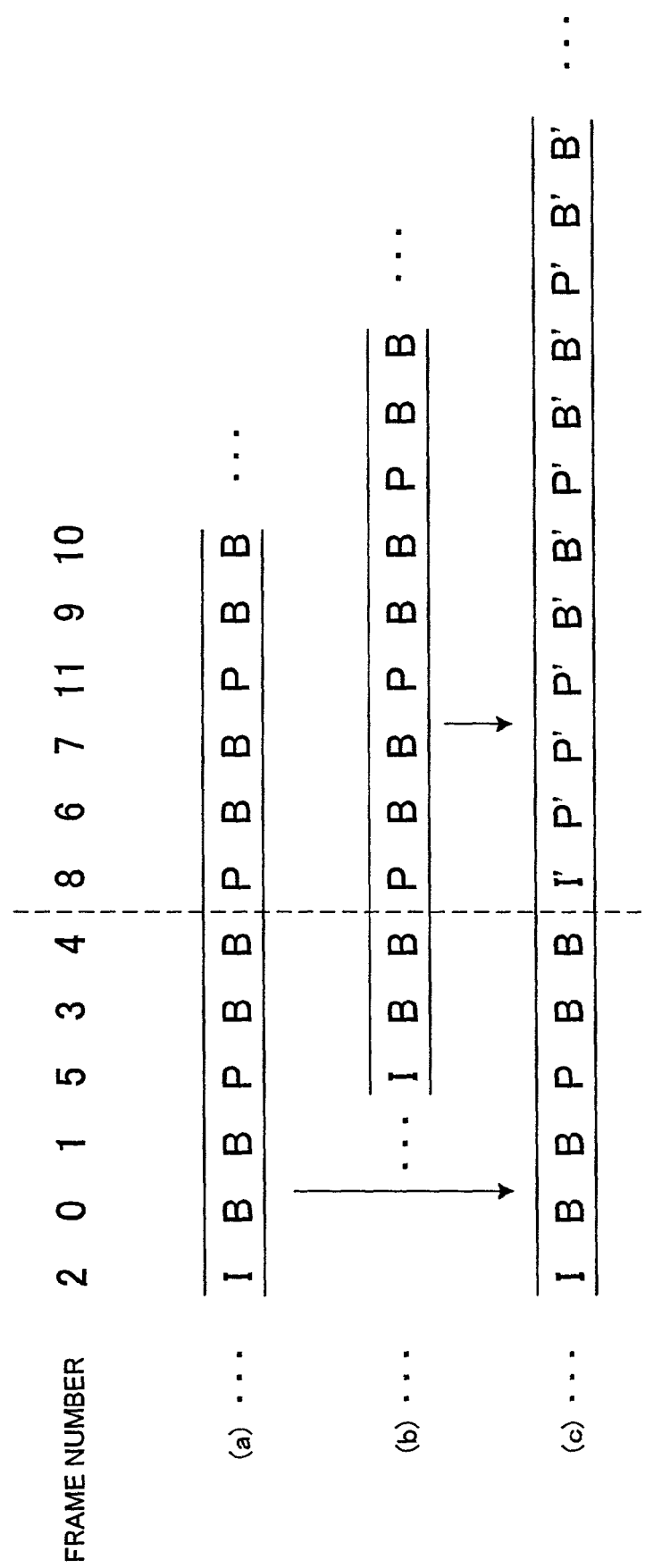
FIG. 13 is a drawing for explaining the moving picture editing method according to a second prior art.

Now, the processing in steps SD3, SD4 and SD6 shown in FIG. 9, that is, the C condition check processing of checking whether the frame $X_1$, $X_2$ or X meets the predetermined condition β, will be described with reference to the flow chart shown in FIG. 11.

First, in step SF1, the CPU checks whether the frame X has been re-encoded in the edition. If the result of this check is "YES", it means that error has been generated in the frame X due to the re-encoding. The CPU thus determines that the frame X fails to meet the predetermined condition β.

If the check result in step SF1 is "NO", that is, the frame X has not been re-encoded in the edition, the CPU executes step SF2. In step SF2, the CPU checks whether coded data of the frame X has been changed in the edition. If the result of this check is "NO", it is thought that the error generated in the frame X due to the edition is small so that error generated in the coded data Y before editing due to the edition will now be reduced even by re-encoding the picture difference (Y−MC(X', V')) of the decoded data Y with reference had to the frame X. The CPU thus determines that the frame X meets the predetermined condition β.

If the check result in step SF2 is "YES", that is, if coded data of the frame C has been changed, the CPU executes step SF3. In step SF3, the CPU checks whether the first picture difference data converting method has been selected and the picture difference (Y−MC(X', V')) has been re-encoded with the frame X in the edition. If the result of this check is "NO", it is thought that the second picture difference data converting method has been selected, and that error generated in the frame X due to the edition is small so that error generated in the decoded data Y before editing due to the edition will not be reduced even by re-encoding the picture difference (Y−MC(X', V')) of the decoded data Y before editing with reference had to the frame X. Thus, the CPU determines that the frame X meets the predetermined condition β.

If the check result in step SF3 is "NO", that is, if the first picture difference data converting method has been selected and the picture difference (Y−MC(X', V')) has been re-encoded with the frame X in the edition, on the other hand, the CPU executes step SF4. In step SF4, the CPU controls the comparator/counter 33 to compare the picture difference coded data C'$_1$ after editing fed out from the picture difference coder 13 and the picture difference coded data C before editing and count macroblocks concerning and different in number with the picture difference coded data C'$_1$ and C. The CPU also read out the count result data from the memory in the selector controller 34, and checks whether the count result is greater than a predetermined threshold number. If the result of this check is "NO", it is thought that although the first picture difference data converting method has been selected, the numbers of the macroblocks concerning and different in number with the picture difference coded data C'$_1$ and C are less than the threshold number, and that the error generated in the frame X due to the edition is small so that error generated in the decoded data Y before editing will not be reduced even by re-encoding the picture difference (Y−MC(X', V')) of the decoded data Y before editing with reference had to the frame X. The CPU thus determines that the frame X meets the predetermined condition β.

If the check result in step SF4 is "YES", that is, if the first picture difference data concerting method has been selected and the numbers of the macroblocks concerning and different in number with the picture difference coded data $C'_1$ and C are greater than the predetermined threshold number, the CPU determines that the frame X fails to meet the predetermined condition β.

As has been shown, with the construction of this example, change of motion vector V or re-encoding of picture difference (Y−MC(X', V')) is performed so long as it is possible to reduce error generated due to edition with respect to the decoded data Y before editing, for which error has been generated in the reference frame or frames due to edition. Thus, compared to the previous third embodiment, the necessary computational effort can be reduced without greatly increasing picture quality deterioration that will be generated.

While the embodiments of the present invention have been described in details with reference to the drawings, they are by no means limitative in specific constructions, and changes and modifications in the design are possible without departing from the scope and spirit of the present invention.

For example, it is possible that the re-encoding part and the inter-frame predictive coded frame processing part are constituted by a computer, which comprises a CPU, an internal memory such as a ROM or a RAM, an external memory such as an FDD, an HDD and a CD-ROM driver, a display and a manipulating part, that the above re-encoding part, variable length decoder 1, picture difference converters 2 and 31, motion compensators 21 and 22, motion vector searcher 25, adders 26 and 27, subtracter 28, selector controller 42 and selector 43 are constituted by the CPU, and that these functions are stored as moving picture editing programs in a semiconductor memory such as a ROM or such memory as an FD, an HD and CD-ROM. In this case, the internal memory or the external memory serves as the frame memories 23 and 24, and the moving picture editing programs are read out from the memory medium and fed to the CPU to control the operation thereof. When the moving picture editing programs are started, the CPU functions as the re-encoding part, the variable length decoder 1, the picture difference converters 2 and 31, the motion compensators 21 and 22, the motion vector searcher 25, the adders 26 and 27, the subtracter 28, the selector controller 42 and the selector 43, and the above processings are executed under control of the moving picture editing programs.

Also, the constructions of the above second and third embodiments may of course be applied to the construction of the above fourth embodiment.

Furthermore, all the processings described in connection with the above fourth embodiment may not all be executed; for example, it is possible to use only motion vector before editing and change only picture difference coded data C. Conversely, it is possible to use only picture difference coded data C before editing and change only motion vector V.

As has been described in the foregoing, with the construction according to the present invention, if one or two reference frames utilized for motion compensation of a subject frame, constituting a part of the moving picture before editing and not deleted in edition so as to constitute part of the moving picture after editing, is or are subject to error generation in processing although not subject to lack in edition, motion vectors in a range centered on each motion vector before editing of the subject frame are searched for the motion vector after editing corresponding to the minimum value of the difference between the motion compensated picture before editing and motion compensated picture after editing. Thus, it is possible to reduce as much as possible the picture quality deterioration generated due to the propagation of the picture quality deterioration generated in the reference frame or frames due to the edition to motion compensated picture after editing.

Also in the present invention, if one or two reference frames utilized for motion compensation of a subject frame, constituting a part of the moving picture before editing and not deleted in edition so as to constitute part of the moving picture after editing, is or are subject to error generation in processing although not subject to lack in edition, motion vectors in a range centered on each motion vector before editing of the subject frame are searched for the motion vector after editing corresponding to the minimum value of the difference between the motion compensated picture before editing and motion compensated picture after editing, and picture difference obtained as a result of subtraction of motion compensated picture after edition, obtained by motion compensation utilizing motion vector after editing, from decoded data before editing of the subject frame, is coded to obtain picture difference coded data after editing, and coding is performed from the picture difference coded data after editing thus obtained and the motion vector after editing to obtain coded data after editing of the subject frame. Thus, it is possible to further reduce the picture quality deterioration generated due to the propagation of the picture quality deterioration generated in the reference frame or frames due to the edition to motion compensated picture after editing.

Further, in the present invention, if one or two reference frames utilized for motion compensation of a subject frame, constituting a part of the moving picture before editing and not deleted in edition so as to constitute part of the moving picture after editing, is subject to error generation in processing although not subject to lack in edition, and also if either one of the reference frames meets at least a condition that error generation in it takes place as a result of re-encoding in edition or a condition that the coded data and the motion vector are changed in edition such that the numbers of macroblocks concerning and different in number with motion vector before editing and motion vector after editing exceed a predetermined threshold number, motion vectors in a range centered on each motion vector before editing of the subject frame are searched for the motion vector after editing corresponding to the minimum value of the difference between the motion compensated picture before edition and motion compensated picture after editing, and also the numbers of macroblocks concerning and different in number with the motion vector before editing and the motion vector after editing are counted. Thus, if it can be determined that the errors generated in the cases of changing and not changing the motion vector of the subject frame are substantially the same in magnitude, no motion vector is changed. Thus, it is possible to reduce the necessary computational effort without increasing the picture quality deterioration generated due to the edition.

Still further, in the present invention, if one or two reference frames utilized for motion compensation of a subject frame, constituting a part of the moving picture before editing and not deleted in edition so as to constitute part of the moving picture after editing, is subject to error generation in processing although not subject to lack in edition, and also if either one of the reference frames meets at least a condition that its error generation takes place as a result of re-encoding in edition or a condition that change in its coded data and re-encoding of its picture difference have taken place in edition such that the numbers of macrobocks concerning and different in number with motion vector before editing and motion vector after editing exceed a predetermined threshold number, picture difference obtained as a result of subtraction of motion compensated picture after editing, obtained by motion compensation utilizing the motion vector after editing of the subject frame, from decoded data before editing of the subject frame is coded to obtain picture difference coded data after editing, also coding is performed from the picture difference coded data after editing and the motion vector after editing to obtain coded data after editing of the subject frame, and the numbers of macroblocks concerning and different in number with picture difference coded data after editing and picture difference coded data before editing. Thus, if it can be determined that the errors generated in the cases of re-encoding and not re-encoding the picture difference of the subject frame are substantially the same in magnitude, no change is performed concerning the re-encoding of picture difference. Thus, it is possible to reduce the necessary computational effort without increasing the picture quality deterioration generated due to the edition.

Further in the present invention, it is possible to reduce the necessary computational effort without increasing the picture quality deterioration generated due to the edition. Thus, such edition as deletion and extraction can be performed on compression coded moving picture as well with a simple construction, with less computational effort and without lack of any frame. It is also possible to suppress picture quality deterioration due to editing.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A moving picture editing method for editing compression coded moving pictures by utilizing inter-frame prediction based on motion compensation, the method comprising:
   determining if reference frames which are utilized for motion compensation of a subject frame before editing and which are not deleted during editing are subject to error generation in processing; and
   searching motion vectors in a range centered on each pre-edit motion vector of the subject frame to find a post-edit motion vector corresponding to a minimum value of a difference between a pre-edit motion compensated picture and a post-edit motion compensated picture.

2. A moving picture editing method for editing compression coded moving pictures by utilizing inter-frame prediction based on motion compensation, the method comprising:
   determining if reference frames which are utilized for motion compensation of a subject frame before editing and which are not deleted during editing are subject to error generation in processing;
   searching motion vectors in a range centered on each pre-edit motion vector of the subject frame to find a post-edit motion vector corresponding to a minimum value of a difference between a pre-edit motion compensated picture and a post-edit motion compensated picture;
   obtaining the post-edit motion compensated picture by motion compensation utilizing the post-edit motion vector;
   coding a picture difference obtained as a result of subtraction of the post-edit motion compensated picture from pre-edit decoded data of the subject frame to obtain post-edit picture difference coded data; and
   coding the post-edit picture difference coded data and the post-edit motion vectors to obtain post-edit coded data of the subject frame.

3. A moving picture editing method for editing compression coded moving pictures by utilizing inter-frame prediction based on motion compensation, the method comprising:
   determining if reference frames which are utilized for motion compensation of a subject frame before editing and which are not deleted during editing are subject to error generation in processing;
   determining if at least one of the reference frames meets at least a condition that error generation in the reference frame results from re-encoding during editing or a condition that coded data has changed and a motion vector has changed during editing such that a number of macroblocks having a difference between a pre-edit motion vector and a post-edit motion vector exceeds a threshold numbers;
   searching motion vectors in a range centered on each pre-edit motion vector of the subject frame to find the post-edit motion vector corresponding to a minimum value of a difference between a pre-edit motion compensated picture and a post-edit motion compensated picture, and
   counting the number of macroblocks having a difference between the pre-edit motion vector and the post-edit motion vector.

4. A moving picture editing method for editing compression coded moving pictures by utilizing inter-frame prediction based on motion compensation, the method comprising:
   determining if reference frames which are utilized for motion compensation of a subject frame before editing and which are not deleted during editing are subject to error generation in processing;
   determining if at least one of the reference frames meets at least a condition that error generation in the reference frame results from re-encoding during editing or a condition that coded data has changed and a picture difference has been re-encoded during editing and a number of macroblocks of post-edit picture difference coded data and a number of macroblocks of pre-edit picture difference coded data exceed a threshold number;
   obtaining a post-edit motion compensated picture by motion compensation utilizing a post-edit motion vector of a subject frame;
   subtracting the post-edit motion compensated picture from pre-edit decoded data of the subject frame to obtain the picture difference;
   coding the picture difference to obtain the post-edit picture difference coded data;
   coding the post-edit picture difference coded data and pre-edit motion vectors to obtain post-edit coded data of the subject frame and the number of macroblocks having a differenee between the post-edit picture difference coded data and the pre-edit picture difference coded data.

5. A moving picture editing method for editing compression coded moving pictures by utilizing inter-frame prediction based on motion compensation, the method comprising:

determining if reference frames which are utilized for motion compensation of a subject frame before editing and which are not deleted during editing are subject to error generation in processing during editing;

determining if at least one of the reference frames meets a condition that coded data and a motion vector are changed during editing such that a number of macroblocks having a difference between a pre-edit motion vector and a post-edit motion vector exceeds a threshold number, or meets at least a condition that the coded data is not changed during editing, a condition that a picture difference is not re-encoded during editing although the coded data is changed therein, or a condition that, although the coded data has changed and the picture difference has been re-encoded during editing, the number of macroblocks having a difference between post-edit picture difference coded data and pre-edit picture difference coded data is less than a threshold number, searching motion vectors in a range centered on each pre-edit motion vector of the subject frame for the motion vector corresponding to a minimum value of a difference between a pre-edit motion compensated picture and a post-edit motion compensated picture;

counting the number of macroblocks having a difference between the pre-edit motion vector and the post-edit motion vector;

determining if the reference frames each meet at least a condition that the coded data has not changed during editing, a condition that the motion vectors are not changed during editing, or a condition that the number of macroblocks having a difference between the pre-edit motion vector and the post-edit motion vector is less than a threshold number;

determining if the reference frames meet a condition that the coded data has changed and the picture difference has been re-encoded during editing such that the number of macroblocks having a difference between the post-edit picture difference coded data and the pre-edit picture difference coded data exceeds a threshold number;

subtracting a post-edit motion compensated picture from pre-edit decoded data of the subject frame to obtain a picture difference;

coding the picture difference to obtain post-edit picture difference coded data;

coding the post-edit picture difference coded data and the post-edit motion vector of the subject frame;

counting the number of macroblocks having a difference between the post-edit picture difference coded data and the pre-edit picture difference coded data; and determining if one of the reference frames meets at least a first condition that it is a frame subject to error generation due to re-encoding during editing, or a second condition that the coded data has changed and the picture difference has been re-encoded during editing such that the number of macroblocks having a difference between the pre-edit motion vector and the post-edit motion vector exceeds a threshold number and the number of macroblocks having a difference between the post-edit picture difference coded data and the pre-edit picture difference coded data exceeds a threshold number;

searching motion vectors in a range centered on the pre-edit motion vector of the subject frame to find the motion vector corresponding to a minimum value of a difference between a pre-edit motion compensated picture and a post-edit motion compensated picture;

counting the number of macroblocks having a difference between the pre-edit motion vector and the post-edit motion vector;

subtracting the post-edit motion compensated picture from the pre-edit decoded data of the subject frame to obtain post-edit picture difference coded data;

coding the post-edit picture difference coded data and the pre-edit motion vector to obtain post-edit coded data of the subject frame; and counting the number of macroblocks having a difference between post-edit picture difference coded data and pre-edit picture difference coded data.

6. The moving picture editing method as in any one of claims 1–3 or 5, wherein candidates for each post-edit motion vector are limited to motion vectors present in a range centered on the pre-edit motion vector.

7. The moving picture editing method as in any one of claims 1–3 or 5, wherein candidates for each post-edit motion vector are limited to motion vectors which are equal to the pre-edit motion vector or motion vectors present in a range centered on the pre-edit motion vector and having a non-integer coordinate value as a horizontal or vertical coordinate value.

8. A moving picture editing system for editing compensation coded moving pictures by utilizing inter-frame prediction based on motion compensation, the system comprising:

a motion vector searcher which searches motion vectors in a range centered on each pre-edit motion vector to find a motion vector corresponding to a minimum value of a difference between a pre-edit motion compensated picture and a post-edit motion compensated picture; and a controller which controls a motion vector searcher to search for the post-edit motion vector of a subject frame when reference frames which are utilized for motion compensation of a picture frame and which are not deleted during editing are subject to error generation in processing during editing.

9. The moving picture editing system according to claim 8, further comprising:

a motion compensator which performs motion compensation utilizing the post-edit motion vector to obtain a post-edit motion compensated picture;

a subtracter which subtracts the post-edit motion compensated picture from pre-edit decoded data of the subject frame to obtain a picture difference; and a variable length coder which codes a post-edit picture difference coded data and the post-edit motion vector to obtain post-edit coded data of the subject frame.

10. A moving picture editing system for editing compensation coded moving pictures by utilizing inter-frame prediction based on motion compensation, the system comprising:

a motion vector searcher which searches motion vectors in a range centered on each pre-edit motion vector to find a motion vector corresponding to a minimum value of a difference between a pre-edit motion compensated picture and a post-edit motion compensated picture;

a counter which counts macroblocks having a difference between a pre-edit motion vector and a post-edit motion vector; and a controller which controls the motion vector searcher and the counter, wherein when reference frames which are utilized for motion compensation of a subject frame before editing and which are not deleted during editing are subject to error generation in processing, and if at least one of the reference frames meets at least a condition that error generation in the reference frame results from re-encoding during editing or a condition that coded data has changed and the motion vector has changed during editing such that a number of macroblocks having a difference between the pre-edit motion vector and the post-edit motion vector exceeds a threshold number, the controller controls the motion vector searcher to search for the post-edit motion vector the subject frame and the counter to count the number of macroblocks having a difference between the pre-edit motion vector and the post-edit motion vector.

11. A moving picture editing system for editing compensation coded moving pictures by utilizing inter-frame prediction based on motion compensation, the system comprising:
a motion compensator which performs motion compensation utilizing a post-edit motion vector to obtain a post-edit motion compensated picture;
a subtracter which subtracts the post-edit motion compensated picture from pre-edit decoded data of a subject frame to obtain a picture difference;
a variable length coder which codes post-edit picture difference coded data and the post-edit motion vector to obtain post-edit coded data of the subject frame;
a counter which counts macroblocks having a difference between the post-edit picture difference coded data and pre-edit picture difference coded data; and
a controller which controls the motion compensator to obtain the post-edit motion vector of the subject frame, controls the subtracter to subtract the post-edit motion compensated picture from the decoded data before editing of the subject frame, controls the picture difference coder to code the post-edit picture difference coded data, controls the variable length coder to code the post-edit coded data of the subject frame, and controls the counter when reference frames which are utilized for motion compensation of a subject frame before editing and which are not deleted during editing are subject to error generation in processing during editing, and if at least one of the reference frames meets at least a condition that error generation in the reference frame results from re-encoding during editing or from a condition that coded data has changed during editing and the picture difference is re-encoded such that the number of macroblocks having a difference between post-edit picture difference coded data and pre-edit picture difference coded data exceeds a threshold number.

12. A moving picture editing system for editing compensation coded moving pictures by utilizing inter-frame prediction based on motion compensation, the system comprising:
a motion vector searcher which searches motion vectors in a range centered on each pre-edit motion vector to find a motion vector corresponding to a minimum value of a difference between a pre-edit motion compensated picture and a post-edit motion compensated picture;
a first counter which counts a number of macroblocks having a difference between a pre-edit motion vector and a post-edit motion vector;

a motion compensator which performs motion compensation utilizing the post-edit motion vector of a subject frame to obtain a motion compensated picture;
a subtracter which subtracts the post-edit motion compensated picture from pre-edit decoded data of the subject frame;
a picture difference coder which codes post-edit picture difference coded data from the picture difference;
a variable length coder which codes post-edit coded data of the subject frame from the post-edit difference picture coded data and the post-edit motion vector;
a second counter which counts macroblocks having a difference between the post-edit picture difference coded data and pre-edit picture difference coded data; and
a controller,
wherein if reference frames which are utilized for motion compensation of a subject frame and which are not deleted during editing are subject to error generation in processing during editing, and if at least one of the reference frames meets a condition that coded data has changed and the motion vector has changed during editing, such that a number of macroblocks having a difference between a pre-edit motion vector and a post-edit motion vector exceeds a threshold number, or meets at least a condition that the coded data has not changed during editing, a condition that the picture difference is not re-encoded during editing although the coded data has changed therein, or a condition that, although the coded data has changed and the picture difference has been re-encoded during editing, the number of macroblocks having a difference between post-edit picture difference coded data and pre-edit picture difference coded data is less than a threshold number, the controller controls the motion vector searcher to search the post-edit motion vector of the subject frame and controls the first counter to count the number of macroblocks having a difference between the pre-edit motion vector of the subject frame and the post-edit motion vector thereof, and
wherein if the reference frames each meet at least a condition that the coded data has not changed during editing, a condition that motion vectors have not changed during editing, or a condition that a number of macroblocks having a difference between a pre-edit motion vector and a post-edit motion vector is less than a threshold number, or the reference frames meet a condition that the coded data has changed and the picture difference has been re-encoded during editing such that the number of macroblocks having a difference between post-edit picture difference coded data and pre-edit picture difference coded data exceeds a threshold number, the controller controls the motion compensator to obtain a post-edit motion compensated picture of the subject frame, controls the subtracter to subtract the post-edit motion compensated picture of the subject frame from post-edit decoded data of the subject frame so as to obtain a picture difference, controls the picture difference coder to execute coding to obtain post-edit picture difference coded data of the subject frame and controls the second counter to count macroblocks having a difference between the post-edit picture difference coded data of the subject frame and the pre-edit picture difference coded data thereof, and
at least one of the reference frames meets at least a first condition that it is a frame subject to error generation due to re-encoding during editing, or a second condition that the coded data has changed and the picture difference has been re-encoded during editing such that the number of macroblocks having a difference between a pre-edit motion vector and a post-edit motion vector exceeds a threshold number and the number of macroblocks having a difference between post-edit picture difference coded data and pre-edit picture difference coded data exceeds a threshold number, the controller controls the motion vector searcher to search for the post-edit motion compensated picture of the subject frame, controls the first counter to count macroblocks having a difference between a post-edit motion vector of the subject frame and a pre-edit motion vector thereof, controls the subtracter to subtract the post-edit motion vector of the subject frame from the pre-edit decoded data of the subject frame so as to obtain the a picture difference, controls the picture difference coder to execute coding so as to obtain the post-edit picture difference coded data of the subject frame, controls the variable length coder to execute coding so as to obtain post-edit coded data of the subject frame and controls the second counter to count macroblocks having a difference between the post-edit picture difference coded data of the subject frame and the pre-edit picture difference coded data thereof.

13. The moving picture editing system as in any one of claims 8–10 or 12, wherein the controller limits the range of search of motion vectors after editing in the motion vector searcher to motion vectors which are the same as the post-edit motion vector or motion vectors present in a range in the neighborhood of the post-edit motion vector.

14. The moving picture editing system as in any one of claims 8–10 or 12, wherein the controller limits the range of search of motion vectors after editing in the motion vector searcher to motion vectors which are the same as the post-edit motion vector or motion vectors present in a range in the neighborhood of the post-edit motion vector and having non-integer coordinate values as horizontal or vertical coordinate values.

15. A computer-readable storage medium, in which moving picture editing computer programs for realizing the functions set forth in any one of claims 1–5 or 8–12 in a personal computer are stored.

* * * * *